(12) United States Patent
Tanaka et al.

(10) Patent No.: US 8,182,705 B2
(45) Date of Patent: May 22, 2012

(54) METHOD FOR PRODUCING THIN FILM MAGNETIC HEAD HAVING MAGNETORESISTIVE EFFECT ELEMENT

(75) Inventors: Kosuke Tanaka, Tokyo (JP); Daisuke Miyauchi, Tokyo (JP); Takumi Yanagisawa, Tokyo (JP)

(73) Assignee: TDK Corporation, Tokyo (JP)

( * ) Notice: Subject to any disclaimer, the term of this patent is extended or adjusted under 35 U.S.C. 154(b) by 400 days.

(21) Appl. No.: 12/609,616

(22) Filed: Oct. 30, 2009

(65) Prior Publication Data

US 2011/0100953 A1 May 5, 2011

(51) Int. Cl.
*B44C 1/22* (2006.01)
(52) U.S. Cl. .. 216/22; 216/37; 360/324.12; 360/327.32; 360/25; 360/77.03; 360/75
(58) Field of Classification Search ............. 360/324.12, 360/327.32, 25, 77.03; 216/22, 37
See application file for complete search history.

(56) References Cited

U.S. PATENT DOCUMENTS

| | | | |
|---|---|---|---|
| 6,656,538 B2 | 12/2003 | Sato et al. | |
| 2008/0253037 A1* | 10/2008 | Kagami et al. | 360/324 |

FOREIGN PATENT DOCUMENTS

| | | |
|---|---|---|
| JP | A-S61-110320 | 5/1986 |
| JP | A-H05-101339 | 4/1993 |
| JP | A-H07-85432 | 3/1995 |
| JP | A-H10-172115 | 6/1998 |

* cited by examiner

*Primary Examiner* — Nadine Norton
*Assistant Examiner* — Maki Angadi
(74) *Attorney, Agent, or Firm* — Posz Law Group, PLC

(57) ABSTRACT

A method for producing a thin film magnetic head including a magnetoresistive effect element (MR element) that has a magnetic sensor multi-layered film with a polygonal shape such that a vertex angle faces an air bearing surface (ABS) and a tip of the vertex angle is cut when the magnetic sensor multi-layered film is viewed from an X-Y plane that is parallel to a plane of a lower shield electrode layer includes a step for stopping a lapping process by using a measurement point in which a resistance value is steeply increased while the lapping face is gradually approaching the vertex angle of polygonal shape by lapping from the ABS side. Therefore, an excellent effect in which an ultra narrow track width that exceeds limits of photolithography technology can be securely and constantly formed is obtained.

20 Claims, 26 Drawing Sheets

Polishing Direction

Polishing Direction

METHOD FOR PRODUCING THIN FILM MAGNETIC HEAD HAVING MAGNETORESISTIVE EFFECT ELEMENT

BACKGROUND OF THE INVENTION

1. Field of the Invention

The present invention relates to a magnetoresistive effect element (MR element) that detects magnetic field intensity as a signal from a magnetic recording medium and, especially relates to a method for producing a thin film magnetic head that has an MR element in a current perpendicular to plane (CPP) type structure (CPP-MR element), and more specifically relates to a method for producing a thin film magnetic head in which a track width having an ultra narrow size that exceeds limits of photolithography technology can be securely and constantly formed.

2. Description of Related Art

In recent years, with an increase in the high recording density of hard disk drives (HDD), there have been growing demands for improvements in the performance of thin film magnetic heads. For a thin film magnetic head, a composite type thin film magnetic head has been widely used; it has a structure where a reproducing head having a read-only magnetoresistive effect element (hereinafter, magneto-resistive (MR) element) and a recording head having a write-only induction type magnetic conversion element are laminated together.

As a reproducing head, a GMR element having a current perpendicular to plane (CPP) structure (CPP-GMR element) has been proposed. The CPP-GMR element does not includes an insulating layer between upper and lower shield layers (i.e., the upper part shield layer and the lower part shield layer) with a structure in which the upper and lower shield layers and an MR element are electrically connected in series. This technology is essential to achieve a high recording density that exceeds 200 Gbits/in$^2$.

The CPP-GMR element has a lamination structure containing a first ferromagnetic layer and a second ferromagnetic layer formed in a manner of sandwiching a conductive nonmagnetic intermediate layer from both sides. The typical spin valve type CPP-GMR element has a lamination structure from the substrate side sequentially as follows: a lower electrode, an antiferromagnetic layer, a first ferromagnetic layer, a nonmagnetic intermediate layer, a second ferromagnetic layer and an upper electrode.

A magnetization direction of the first ferromagnetic layer, which is one of the ferromagnetic layers, is pinned in the perpendicular direction to a magnetization direction of the second ferromagnetic layer when the externally applied magnetic field is zero. The magnetization of the first ferromagnetic layer can be pinned by making an antiferromagnetic layer adjacent thereto and providing unidirectional anisotropic energy (also referred to as "exchange bias" or "coupled magnetic field") to the first ferromagnetic layer by means of exchange-coupling between the antiferromagnetic layer and the first ferromagnetic layer. For this reason, the first ferromagnetic layer is also referred to as a magnetic pinned layer. On the other hand, the second ferromagnetic layer is referred to as a free layer. Generally, a longitudinal bias layer is located and formed on both sides of the free layer in its width direction through an insulating layer.

A tunneling magnetoresistance (TMR) element that uses a tunneling magnetoresistance effect is included in the same category as the CPP structure in view of a flowing direction of an electric current.

With an increase in the recording density, there have been growing demands for improvements in the performance of a reproducing element of a reproducing head, such as narrowing of the "read-gap length," a gap between upper and lower shield layers, and narrowing of a track width, a width of an element. A main object of the present invention is to provide an improved technology to comply with the latter demand, narrowing of the track width. Specifically, a main object of the present invention is to provide a method for producing a thin film magnetic head in which the track width having an ultra narrow size that exceeds limits of a photolithography technology can be securely and constantly formed.

SUMMARY OF THE INVENTION

In order to solve the drawbacks, a method of the present invention for producing a thin film magnetic head including a magnetoresistive effect element (MR element) that has a magnetic sensor multi-layered film with a polygonal shape such that a vertex angle faces an air bearing surface (ABS) and a tip of the vertex angle is cut when the magnetic sensor multi-layered film is viewed from an X-Y plane that is parallel to a plane of a lower shield electrode layer, and a sense current flows in a lamination direction (Z direction) in the MR element, has: step for forming the magnetic sensor multi-layered film on the lower shield electrode layer; step for forming a hard mask for etching on the magnetic sensor multi-layered film; step for first etching the hard mask for etching to form a cut surface including one side that configures the vertex angle by etching the hard mask through a mask that is formed by a photoresist method; step for second etching the hard mask for etching to form a cut surface including another side that configures the vertex angle and to complete the hard mask with a polygonal shape (polygonally shaped hard mask) in which the vertex angle faces the ABS and by etching the hard mask for etching that is formed by the step for first etching through a mask that is formed by a photoresist method; step for etching the magnetic sensor multi-layered film to form a stack configured with a polygonally shaped magnetic sensor multi-layered film and the residual polygonally shaped hard mask by etching the magnetic sensor multi-layered film through the polygonally shaped hard mask as a mask; step for forming a first insulating layer on the stack of the polygonally shaped magnetic sensor multi-layered film and the residual polygonally shaped hard mask and on the lower shield electrode layer on which the stack is formed; step for forming a bias magnetic field application layer on the first insulating layer; step for forming a second insulating layer on the bias magnetic field application layer; step for processing planarization to planarize the polygonally shaped hard mask such that a certain thickness of the hard mask remains; step for forming two contact holes that lead to the bias magnetic field application layer by etching the second insulating layer at both edges of the stack in the width direction with respect to the stack of the polygonally shaped magnetic sensor multi-layered film and the residual polygonally shaped hard mask that is laminated on the polygonally shaped magnetic sensor multi-layered film; step for stopping a lapping process by using a measurement point in which a resistance value is steeply increased while the lapping face is gradually approaching the vertex angle of polygonal shape by lapping from the ABS side and as measuring the resistance value by connecting the two contact holes with each other.

As a preferred embodiment of the method of the present invention for producing the thin film magnetic head, a part surrounded by the first insulating layer exists in the vicinity of sides of the polygonally shaped magnetic sensor multi-layered film through the step for forming the first insulating layer.

As a preferred embodiment of the method of the present invention for producing the thin film magnetic head, the first insulating layer exists in the vicinity of sides of the magnetic sensor multi-layered film in the polygonal shape through the step for processing planarization, and the first insulating layer is configured to have an outer frame that is similar to an outer circumference of the polygonally shaped magnetic sensor multi-layered film.

As a preferred embodiment of the method of the present invention for producing the thin film magnetic head, in the step for stopping the lapping process by using the measurement point in which the resistance value is steeply increased, the lapping process is stopped after a certain time, which is predetermined in relation to the lapping speed, elapses since the resistance value is steeply increased because conductivity is lost due to cutting the tip of the vertex angle of the polygon.

As a preferred embodiment of the method of the present invention for producing the thin film magnetic head, the tip of the vertex angle of the magnetic sensor multi-layered film is cut through the step for stopping the lapping process by using the measurement point in which the resistance value is steeply increased, and a track width is regulated based on an exposed width.

As a preferred embodiment of the method of the present invention for producing the thin film magnetic head, the track width is 10-35 nm.

As a preferred embodiment of the method of the present invention for producing the thin film magnetic head, between the step for processing planarization and the step for forming two contact holes, a step for regulating an MR height that is a posterior length of the rear edge part of the magnetic sensor multi-layered film and for etching to form an upper shield electrode layer is included.

As a preferred embodiment of the method of the present invention for producing the thin film magnetic head, after the step for regulating the MR height and etching to form the upper shield electrode layer, a step for refilling an etched portion formed by the above step with an insulating film is included.

As a preferred embodiment of the method of the present invention for producing the thin film magnetic head, the magnetic sensor multi-layered film is configured with a spacer layer, a magnetic pinned layer and a free layer that are laminated to sandwich the spacer layer, and the bias magnetic field application layer is located on the both sides of the multi-layered film in the width direction through the first insulating layer.

As a preferred embodiment of the method of the present invention for producing the thin film magnetic head, the polygonal shape is one of a triangle and a pentagon.

As a preferred embodiment of the method of the present invention for producing the thin film magnetic head, the hard mask is made of Ta, Ru, or Cr.

In another aspect, a method of the present invention for producing a thin film magnetic head including a magnetoresistive effect element (MR element) that has a magnetic sensor multi-layered film having a polygonal shape such that a vertex angle faces an air bearing surface (ABS) and a tip of the vertex angle is cut when the magnetic sensor multi-layered film is viewed from an X-Y plane that is parallel to a plane of a lower shield electrode layer, and a sense current flows in a lamination direction (Z direction) in the MR element has: step for forming the magnetic sensor multi-layered film on the lower shield electrode layer; step for forming a photoresist film on the magnetic sensor multi-layered film; step for a first exposure to expose the photoresist film after a mask is applied with respect to the photoresist film for making a latent image for a cut surface including one side that configures the vertex angle; step for a second exposure to expose the photoresist film after a mask is applied with respect to the photoresist film for making a latent image that is for a cut surface including another side that configures the vertex angle and that is for the polygonal shape in which the vertex angle faces the ABS; step for a development to develop the photoresist film so as to maintain the photoresist film with the polygonal shape (polygonally shaped photoresist film) after the steps for the first and second exposures; step for etching the magnetic sensor multi-layered film using the polygonally shaped photoresist film as a resist mask for etching (polygonally shaped resist mask) in order to form a stack configured with a polygonally shaped magnetic sensor multi-layered film and the residual polygonally shaped photoresist film; step for forming a first insulating layer on the stack of the polygonally shaped magnetic sensor multi-layered film and the resist mask for etching with the polygonal shape (polygonally shaped resist mask) and on the lower shield electrode layer on which the stack is formed; step for forming a bias magnetic field application layer on the first insulating layer; step for forming a second insulating layer on the bias magnetic field application layer; step for processing planarization to planarize the polygonally shaped resist mask for etching such that a certain thickness of the resist mask for etching remains; step for removing the residual polygonally shaped resist mask for etching; step for forming two contact holes that lead to the bias magnetic field application layer by etching the second insulating layer at both edges of the stack in the width direction with respect to the polygonally shaped magnetic sensor multi-layered film; step for stopping a lapping process by using a measurement point in which a resistance value is steeply increased while the lapping face is gradually approaching the vertex angle of polygonal shape by lapping from the ABS side and as measuring the resistance value through connecting the two contact holes with each other.

DETAILED DESCRIPTION OF THE PREFERRED EMBODIMENTS

The best mode for implementing the present invention will be described in detail hereafter.

Before a method for producing a thin film magnetic head according to the present invention is explained in detail, primary parts of a device to be manufactured according to the present invention, a representative structure of an MR element, and a structure of a thin film magnetic head that has the MR element are explained.

The MR element is not limited to types and structures of an element discussed below so long as the state of two magnetic layers that function as sensors relatively varies depending on an externally applied magnetic field.

[Explanation for Representative Structure of MR Element]

An MR element having a CPP structure (CPP-MR element) as a representative example of an MR element is explained. However, the present invention is not limited to the structure of the element.

Figure 1:
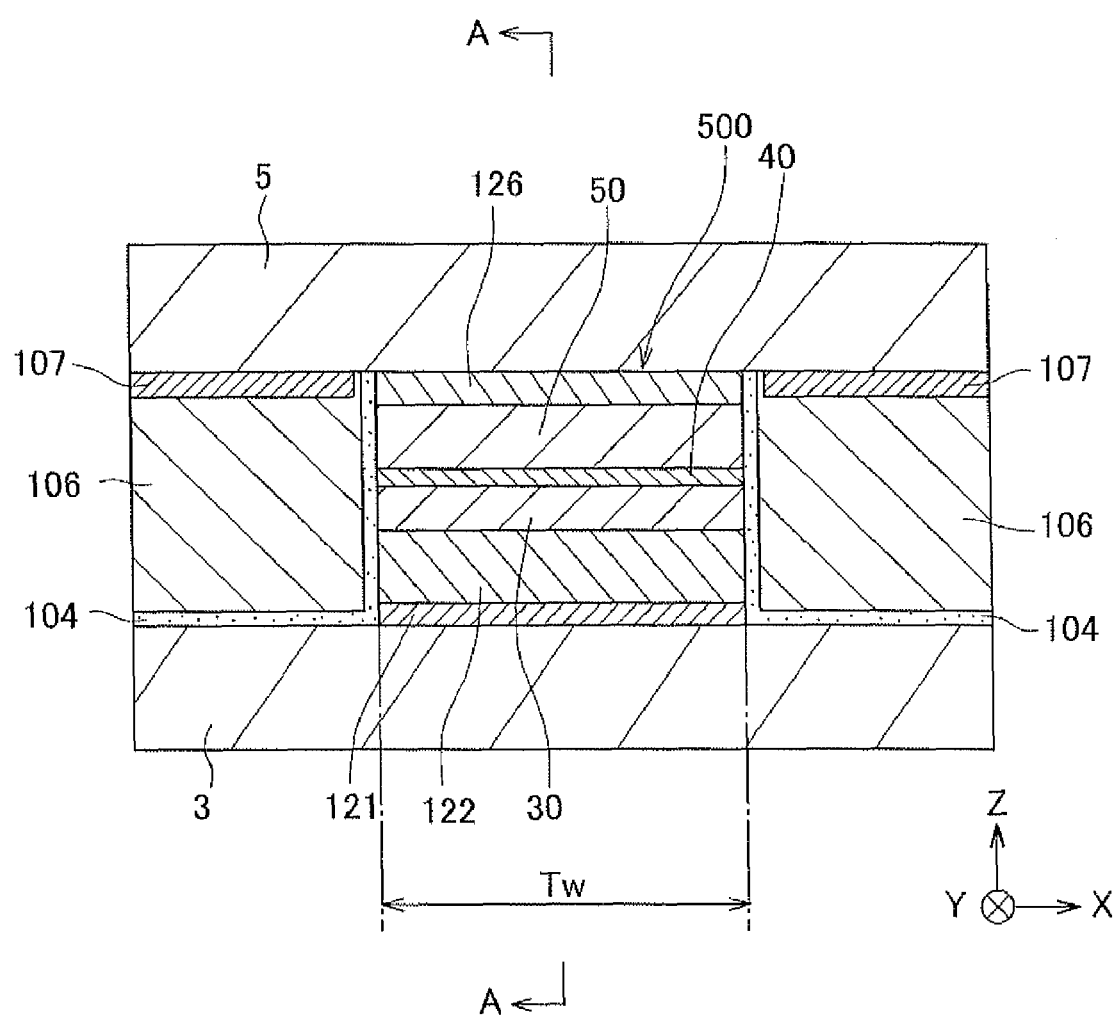
FIG. 1 is a sectional view of a reproducing element (MR element) of a reproducing head that is parallel to an opposing medium surface (or air bearing surface, hereinafter collectively ABS) of a recording medium according to one embodiment of the present invention.

FIG. 1 is a sectional view of an air bearing surface (ABS) of a reproducing head according to one embodiment of the present invention. Specifically, it shows the ABS of a magnetoresistive effect element in a CPP type structure (CPP-MR element).

The ABS generally corresponds to a surface at which a reproducing head is in opposition to a recording medium (hereinafter often called the opposing medium surface or ABS). However, it is understood that the ABS of the present invention includes not only the surface but also a section where a lamination structure of the element can be clearly observed. For instance, a passivation layer of diamond-like carbon (DLC) or the like (the passivation layer adapted to cover the element), in a strict sense, positioned at the ABS may be omitted if necessary.

Figure 2:
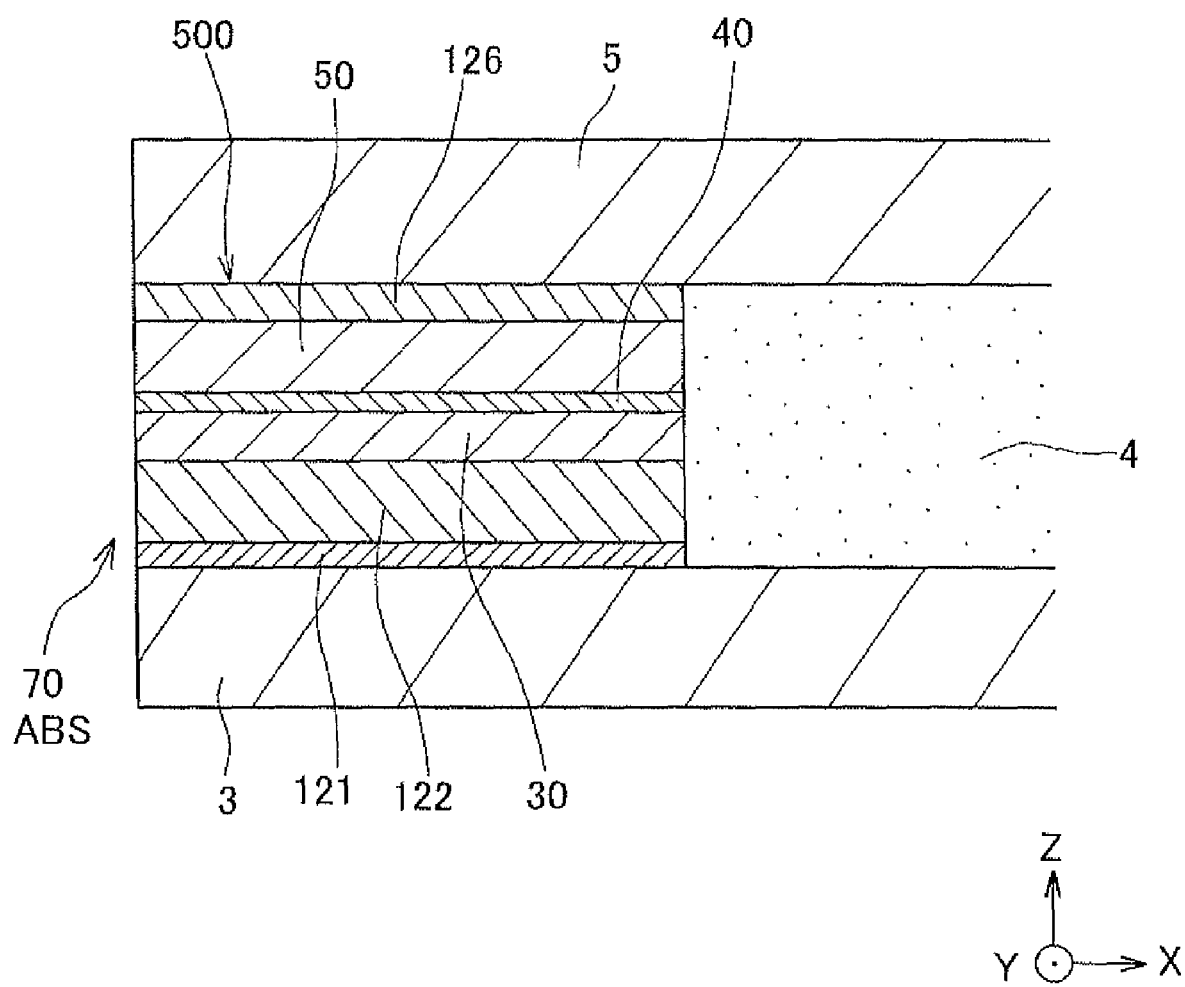
FIG. 2 is a sectional view taken along the A-A plane along the arrow direction in FIG. 1.

FIG. 2 is a sectional view taken along the A-A plane along the arrow direction in FIG. 1.

In the explanation below, the X axis is defined as "width," the Y axis is defined as "length," and the Z axis is defined as "thickness" in each drawing. In the Y axis direction, an area that is close to an ABS (hereinafter, referred as an opposing medium surface) is defined as "front," and an area that is opposite side of the front is defined as "rear (or posterior)." The laminated up direction of an element is defined as "above" or "upper side," and the opposite direction is defined as "below" or "lower side."

As shown in FIG. 1, the reproducing head according to the present embodiment includes a first shield electrode layer 3 (also referred to as a lower shield electrode layer 3) and a second shield electrode layer 5 (also referred to as an upper shield electrode layer 5) that are spaced apart and opposed to each other in a thickness direction, a CPP-MR element 500 (hereinafter referred simply to as "MR element 500") that has a magnetic sensor multi-layered film and that is interposed between the first shield electrode layer 3 and the second shield electrode layer 5, and an insulating layer 104 adapted to directly cover two sides of the MR element 500 (see FIG. 1).

A refill layer 4 that is made of an insulating material is formed in the rear of the MR element 500 (see FIG. 2).

As shown in FIG. 1, two bias magnetic field application layers 106 are formed adjacent to the two sides of the MR element 500 through the insulating layer 104.

In this embodiment, each of the first shield electrode layer 3 and the second shield electrode layer 5 functions both as a magnetic shield and an electrode. Namely, in addition to shield magnetism, they function as a pair of electrodes that enables a sense current to flow in a direction intersecting the plane of each of the layers forming the MR element 500 such as, for instance, in a direction perpendicular to the plane of each of the layers forming the MR element 500 (lamination direction, Z direction).

Each of the first and second shield electrode layers 3 and 5 may be configured with a two-layer structure in which a shield layer is separately formed from an electrode layer.

The CPP-MR element 500 (magnetic sensor multi-layered film 500) according to the present invention as shown in FIG. 1 has a nonmagnetic intermediate layer 40, and a first ferromagnetic layer 30 and a second ferromagnetic layer 50, which are laminated to sandwich the nonmagnetic intermediate layer 40.

Angle of magnetization directions of the first ferromagnetic layer 30 and the second ferromagnetic layer 50 relatively change due to an externally applied magnetic field.

As one embodiment, an example under the following condition is explained. The first ferromagnetic layer 30 functions as a magnetic pinned layer (pinned layer). The second ferromagnetic layer 50 functions as a free layer in which a magnetization direction of the free layer changes due to an externally applied magnetic field, i.e., a signal magnetic field from a recording medium. Namely, the first ferromagnetic layer 30 is the magnetic pinned layer 30. The second ferromagnetic layer 50 is the free layer 50.

The magnetic pinned layer 30 is a layer in which a magnetization direction is fixed by the influence of an antiferromagnetic layer 122. In FIG. 1, there is one embodiment shown in which the antiferromagnetic layer 122 is formed on the substrate side (the side of the first shield electrode layer 3); however, it is possible that the antiferromagnetic layer 122 is formed on the top side (the side of the second shield electrode layer 5), so that the free layer 50 and the magnetic pinned layer 30 are interchanged its position.

Each of layers that configures the MR element 500 (magnetic sensor multi-layered film 500) is further explained in detail.

[Explanation of Magnetic Pinned Layer 30]

The magnetic pinned layer 30 (first ferromagnetic layer 30) according to the present invention is formed on the antiferromagnetic layer 122 having a pinning function through an under layer 121 that is formed on the first shield electrode layer 3.

The magnetic pinned layer 30 is made of a ferromagnetic material, and its examples are as follows: NiFe, CoFe, CoFeB, CoFeNi, $Co_2MnSi$, $Co_2MnGe$, and $FeO_X$ (iron oxide).

This layer is not limited to a single layer. This layer may be configured with a stack with multiple layers.

The structure of the stack as a preferred embodiment is explained. The structure of the magnetic pinned layer 30 may be configured to be laminated from the antiferromagnetic layer 122 side in the following order: an outer layer; a nonmagnetic layer; and an inner layer. In other words, it forms a so-called a synthetic pinned layer.

The outer layer and the inner layer are made of a ferromagnetic material that contains, for example, Co and Fe. The outer layer and the inner layer are antiferromagnetically coupled to each other, and their magnetization directions are fixed in an opposite direction relative to each other.

The outer layer and the inner layer are preferably made of, for example, a $Co_{70}Fe_{30}$ (at %) alloy. It is preferable that a layer thickness of the outer layer is approximately 3-7 nm, and a layer thickness of the inner layer is approximately 3-10 nm.

The nonmagnetic layer is made of a nonmagnetic material that contains at least one element from the group of, for example, Ru, Rh, Ir, Re, Cr, Zr, and Cu. A layer thickness of the nonmagnetic layer is approximately 0.35-1.0 nm. The nonmagnetic layer fixes a magnetization direction of the inner layer and a magnetization direction of the outer layer in directions opposite to each other.

[Explanation of Free Layer 50 and Cap Layer 126]

The free layer 50 (second ferromagnetic layer) is a layer of which a magnetization direction varies due to an externally applied magnetic field, i.e., a signal magnetic field from a recording medium and is formed with a ferromagnetic material having a small coercive force, such as NiFe, CoFe, CoFeB, CoFeNi, $Co_2MnSi$, $Co_2MnGe$, and $FeO_X$ (iron oxide). A layer thickness of the free layer 50 is, for example, approximately 2-10 nm.

The free layer 50 can be configured with a single layer. It may be a multi-layered film that contains several laminated ferromagnetic layers.

As shown in FIG. 1, the cap layer 126 (passivation layer 126) that is made of, for example, a Ta layer or a Ru layer is formed on the free layer 50. The cap layer 126 has a layer thickness of approximately 0.5 to 20 nm.

[Explanation of Nonmagnetic Intermediate Layer 40]

The nonmagnetic intermediate layer 40 according to the present invention is an essential layer to have a magnetoresistive effect (MR effect), and examples of the element are as follows: Cu, Au, Ag, Zn, Ga, $TiO_X$, ZnO, InO, SnO, GaN, indium tin oxide (ITO), $Al_2O_3$, and MgO. The nonmagnetic intermediate layer 40 can be configured with a lamination film with two or more layers.

A layer thickness of the nonmagnetic intermediate layer 40 is approximately 0.5-5 nm.

[Explanation of Antiferromagnetic Layer 122]

The antiferromagnetic layer 122 that operates as a pinning layer functions to fix a magnetization direction of the magnetic pinned layer 30 by exchange-coupling with the magnetic pinned layer 30 described above.

The antiferromagnetic layer 122 is made of antiferromagnetic materials that contain Mn and an element, M', which is at least one element selected from the group of, for example, Pt, Ru, Rh, Pd, Ni, Cu, Ir, Cr, and Fe. It is preferable that the content of Mn is 35-95 at %. The antiferromagnetic material is broken down into two types: (1) a non-heat treatment type antiferromagnetic material that exhibits antiferromagnetism even in the absence of a heat treatment to induce an exchange-coupling magnetic field between it and a ferromagnetic material; and (2) a heat treatment type antiferromagnetic material that exhibits antiferromagnetism by a heat treatment. In the present invention, both types (1) and (2) can be used. For instance, the non-heat treatment type antiferromagnetic material is exemplified by RuRhMn, FeMn, and IrMn. The heat treatment type antiferromagnetic material is exemplified by PtMn, NiMn, and PtRhMn.

A layer thickness of the antiferromagnetic layer 122 is approximately 4-30 nm.

For a layer to fix (pin) a magnetization direction of the magnetic pinned layer 30, it is acceptable to provide a hard magnetic layer that is made of a hard magnetic material, such as CoPt, in place of the aforementioned antiferromagnetic layer 122.

The under layer 121 formed below the antiferromagnetic layer 122 is provided to improve the crystallization and orientation of each of the layers laminated on it, and particularly, to improve the exchange-coupling between the antiferromagnetic layer 122 and the magnetic pinned layer 30. For the under layer 121, for instance, a NiCr layer, or a stack of Ta and NiCr layers is used. A layer thickness of the under layer 121 is about 2-6 nm as an example.

[Explanation of Insulating Layer 104 and Bias Magnetic Field Application Layer 106]

The insulating layer 104 shown in FIG. 1, for instance, is made of alumina ($Al_2O_3$). The bias magnetic field application layer 6, for instance, is made of a hard magnetic layer (hard magnet), or a stack of a ferromagnetic layer and an antiferromagnetic layer, specifically exemplified by CoPt or CoCrPt.

[Explanation of Overall Structure of Thin Film Magnetic Head]

Figure 3:
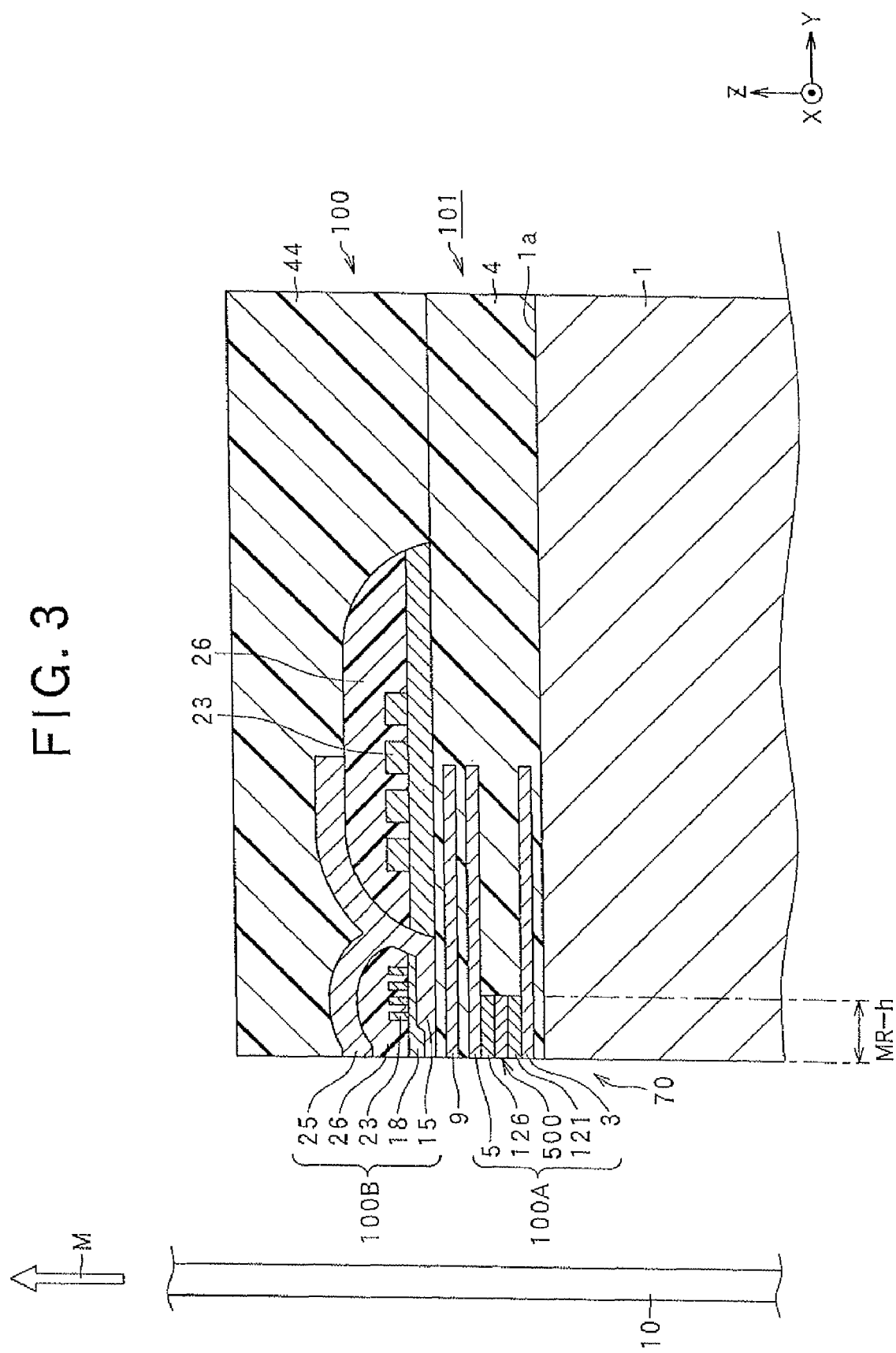
FIG. 3 is a sectional view of a thin film magnetic head that is perpendicular to an ABS.

FIG. 3 shows a sectional view (i.e., a cross section taken through the Y-Z plane) of a thin film magnetic head in parallel with the so-called air bearing surface (ABS).

A thin film magnetic head 100 as shown in FIG. 3 is mounted on a magnetic recording device such as a hard disk drive in order to magnetically process a recording medium 10 such as a hard disk that moves in a medium traveling direction M.

The thin film magnetic head 100 as exemplified in the drawing is a so-called complex type head that is executable for both recording processing and reproducing processing as magnetic processing. As shown in FIG. 3, it has a structure of a magnetic head part 101 formed on a slider substrate 1 structured of ceramic material such as ALTIC ($Al_2O_3$.TiC).

The magnetic head part 101 has a lamination constitution of a reproducing head part 100A for reproducing magnetic information recorded using the MR effect and, for example, a shield type recording head part 100B for executing the recording processing of the perpendicular recording system.

A description is given below in more detail.

A first shield electrode layer 3 and a second shield electrode layer 5 are flat layers formed in a manner of being substantially parallel to the side surface 1a of the slider substrate 1. The layers 3 and 5 form a part of the ABS 70.

An MR element 500 is sandwiched between the first shield electrode layer 3 and the second shield electrode layer 5 and forms part of the ABS 70. A height perpendicular to the ABS 70 (i.e., in the Y direction) is an MR height (MR-h).

The first shield electrode layer 3 and the second shield electrode layer 5 are formed by a pattern plating method including a frame plating method, for example.

The MR element 500 is a lamination layer substantially parallel to the side surface 1a of the slider substrate 1, and forms a part of the ABS 70.

The MR element 500 is a lamination film in a film surface perpendicular type (or current perpendicular to plane: CPP) structure in which a sense current flows in the direction perpendicular to the laminating surface. A tunnel magnetoresistive effect (TMR) film and a CPP type giant magnetoresistive (GMR) film are preferably used. When the MR element 500 uses such MR effect films, the MR element 500 can receive a signal magnetic field from a magnetic disk with a very high sensitivity.

When the TMR element is used for the MR element 500, it has a lamination structure sequentially as follows: an antiferromagnetic layer, a magnetic pinned layer, a tunnel barrier layer, and a magnetic free layer (free layer). The antiferromagnetic layer is made of, for example, InMn, PtMn, NiMn, or RuRhMn, and has a layer thickness of approximately 4-30 nm. The magnetic pinned layer is configured with a synthetic pinned layer in which, for example, CoFe that is a ferromagnetic material or Ru and so on that is a nonmagnetic metal layer is sandwiched by two layers that are made of CoFe and so on. The tunnel barrier layer is made of an oxidation product of Al, AlCu, and Mg that have a layer thickness of approximately 0.5-2 nm. The magnetic free layer (free layer) is configured with a two-layer structure of, for example, CoFe that is a ferromagnetic material and that has a layer thickness of approximately 1 nm and NiFe that has a layer thickness of approximately 3-4 nm. The magnetic free layer (free layer) forms a tunnel junction with the magnetic pinned layer through the tunnel barrier layer. Alternatively, when the GMR layer in the CPP type is used for the MR element 500, the tunnel barrier layer in the TMR layer discussed above is replaced with a nonmagnetic conductive layer that is made of, for example, Cu and that had a layer thickness of approximately 1-3 nm.

Moreover, as shown in FIG. 3, an interelement shield layer 9 made of the same material as that of the second shield electrode layer 5 is formed between the second shield electrode layer 5 and the recording head part 100B.

The interelement shield layer 9 shields the MR element 500 from a magnetic field generated by the recording head part 100B, thereby blocking exogenous noises at the time of reproduction. A bucking coil part may also be formed between the interelement shield layer 9 and the recording head part 100B. The bucking coil part generates magnetic flux that overrides a magnetic flux loop that is generated by the recording head part 100B and that passes through the upper and lower electrode layers of the MR element 500 and, therefore, suppresses unnecessary writing to a magnetic disk or wide area adjacent tracks erasing (WATE) phenomena that are erasing operations.

Insulating films 4 and 44 made of alumina and/or other materials are formed in the following sections:

i) in a gap between the first shield electrode layer 3 and the second shield electrode layer 5 on the side opposite to the ABS 70 of the MR element 500;

ii) in rear (posterior) regions of the first and second shield electrode layers 3 and 5 and the interelement shield layer 9, the rear regions being opposite to the ABS 70;

iii) in a gap between the first shield electrode layer 3 and the slider substrate 1; and iv) in a gap between the interelement shield layer 9 and the recording head part 100B.

The recording head part 100B is preferably structured for perpendicular magnetic recording and, as shown in FIG. 3, has a main magnetic pole layer 15, a gap layer 18, a coil insulating layer 26, a coil layer 23, and an auxiliary magnetic pole layer 25.

The main magnetic pole layer 15 is structured to be a leading magnetic path for leading and focusing magnetic flux initiated by the coil layer 23 to the recording layer of a magnetic recording medium 10. It is preferred that the end part of the main magnetic pole layer 15 on the side of the ABS 70 should be smaller in thickness compared with other portions in the track width direction (i.e., the direction along the X-axis in FIG. 3) and in the laminating direction (i.e., the direction along the Z-axis in FIG. 3). As a result, it is possible to generate a magnetic field for minute and strong writing corresponding to high recording density.

A trailing shield part that has a wider layer cross section than the other portions of the auxiliary magnetic layer 25 is formed on the end part of the auxiliary magnetic pole layer 25 magnetically coupled with the main magnetic pole layer 15 on the side of the ABS 70. As shown in FIG. 3, the auxiliary magnetic pole layer 25 is opposed to the end part of the main magnetic pole layer 15 on the side of the ABS 70 via the gap layer 18 made of insulating material such as alumina and the coil insulating layer 26.

The provision of the auxiliary magnetic pole layer 25 enables formation of a steep magnetic field gradient between the auxiliary magnetic pole layer 25 and the main magnetic pole layer 15 in the vicinity of the ABS 70. As a result, jitter is reduced in a signal output, thereby making the error ratio smaller at the time of reproduction.

The auxiliary magnetic pole layer 25 is formed, for example, to approximately 0.5-5 μm in thickness by a frame plating method, a sputtering method or the like. The material is an alloy made of two or three elements selected from the group consisting of Ni, Fe and Co, for example, or an alloy made of these elements as main components, along with a predetermined element.

The gap layer 18 is formed in a manner of separating the coil layer 23 from the main magnetic pole layer 15. The gap layer 18 is, for example, structured of $Al_2O_3$, diamond-like carbon (DLC) or the like that has a layer thickness of approximately 0.01-0.5 μm and is formed by a sputtering method, a CVD method or the like.

[Explanation of Method for Producing Thin Film Magnetic Head Having MR Element as Primary Part of Present Invention]

The present invention relates to a method for producing a thin film magnetic head that has an MR element 500, and specifically relates to an ultra narrow size of a track width Tw in a sensor site of the MR element shown in FIG. 1, and also specifically relates to a method for producing a thin film magnetic head in which a track having an ultra narrow size that exceeds limits of photolithography technology can be securely and constantly formed. Generally, the track width Tw can be obtained as a width of the free layer 40 in the X direction.

As will be clear from an explanation of a method below, when a magnetic sensor multi-layered film of an MR element is seen from the X-Y plane that is parallel to a plane of a lower shield electrode layer, the shape of the magnetic sensor multi-layered film is a polygon in which a vertex angle faces an ABS with cutting a tip of the vertex angle. More accurately, when the magnetic sensor multi-layered film is viewed three-dimensionally (XYZ), it has a polygonal prism shape. The portion that is made by cutting a tip of the vertex angle in the perpendicular direction among the internal angles of the polygon corresponds to the magnetic sensor multi-layered film in FIG. 1. The magnetic sensor multi-layered film configures the MR element in which a sense current is applied in a lamination direction (Z direction).

In the present invention, a preferred embodiment for the phrase "a polygon in which a vertex angle faces an ABS" is a triangle or a pentagon. A shape of home plate in baseball is a preferred example for the pentagon.

A triangle shape as a preferred example of "a polygon in which a vertex angle faces an ABS" according to one embodiment is discussed below. The embodiment is explained based on the triangle shape.

A method for producing is explained in order.

[Explanation of Method for Producing According to First Embodiment]

A method for producing a thin film magnetic head as a first embodiment that has an MR element according to the present invention is configured with the following steps: (1) step for forming a magnetic sensor multi-layered film; (2) step for forming a hard mask film for etching; (3) step for first etching a hard mask; (4) step for second etching for a hard mask; (5) step for etching the magnetic sensor multi-layered film into a polygonal shape (triangle shape); (6) step for forming a first insulating layer; (7) step for forming a bias magnetic field application layer; (8) step for forming a second insulating layer; (9) step for processing planarization; (10) step for forming contact holes in which two contact holes lead to the bias magnetic field application layer; and (11) step for lapping while measuring resistance.

Each of these steps is explained below in detail with reference to FIGS. 4-14.

Figure 4A:
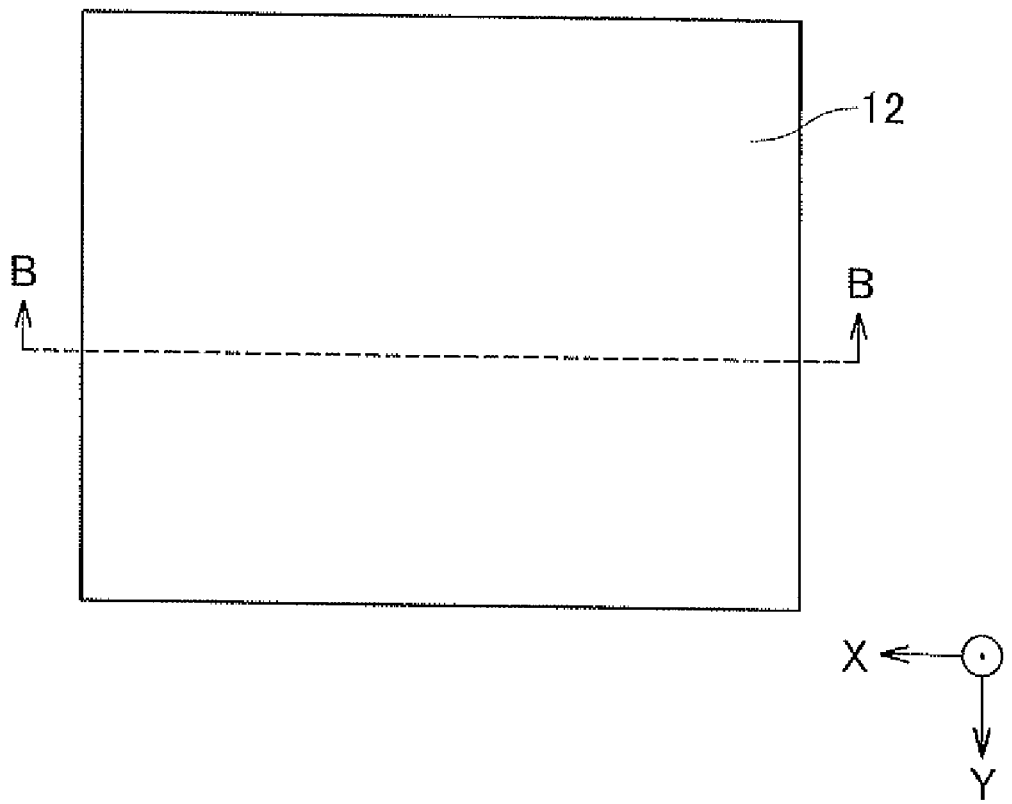
FIG. 4A is a top plan view taken along the X-Y plane to explain a method for producing an element according to a first embodiment of the present invention.
Figure 4B:
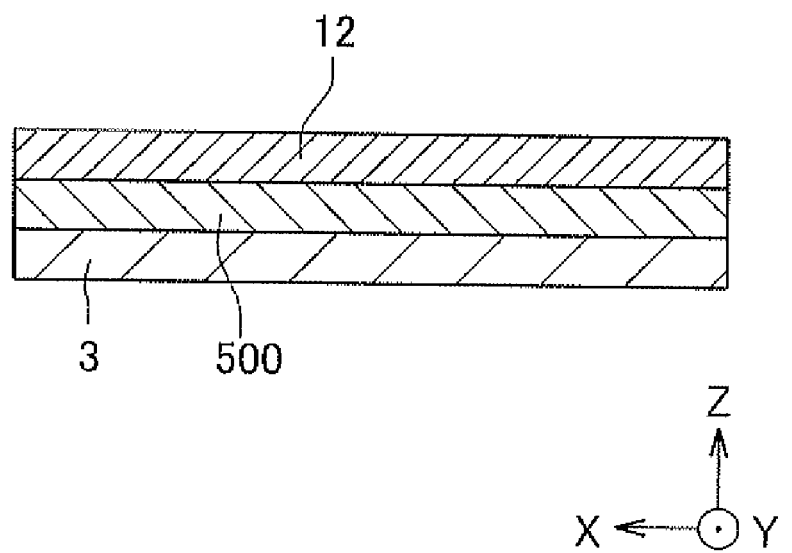
FIG. 4B is a sectional view taken along the B-B plane along the arrow direction in FIG. 4A.
Figure 5A:
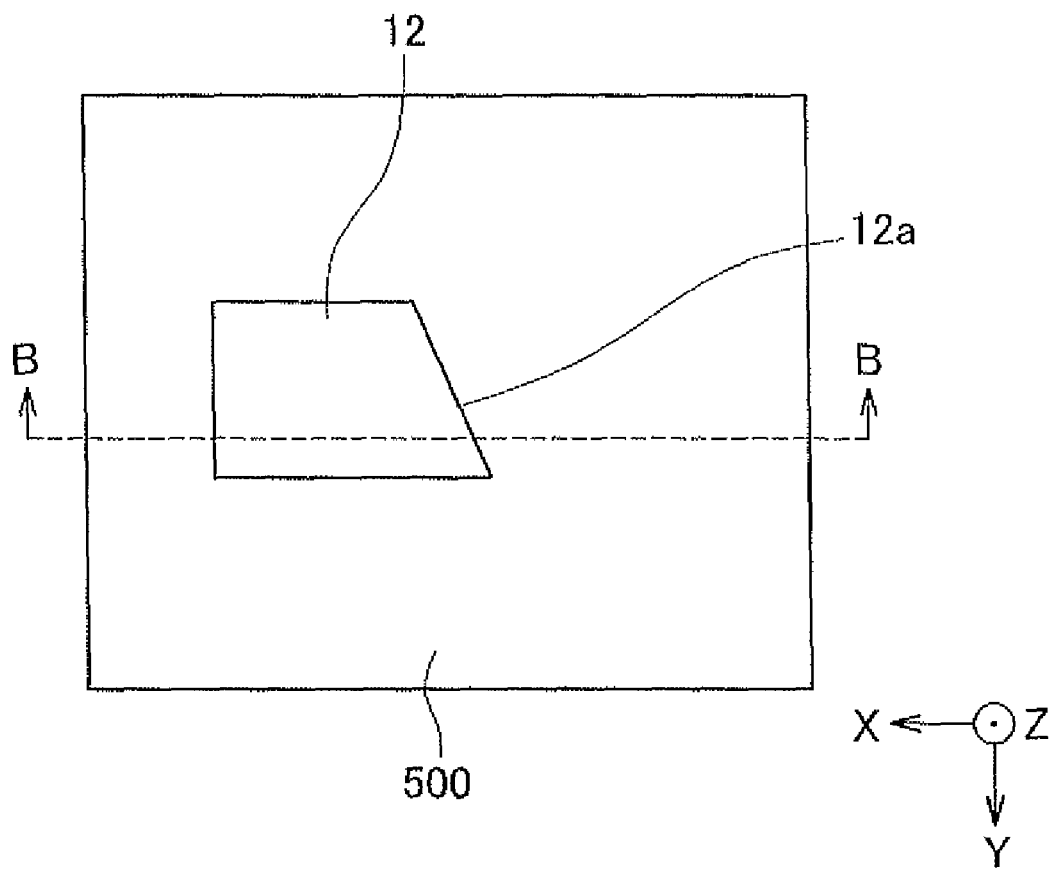
FIG. 5A is a top plan view taken along the X-Y plane to explain a method for producing an element according to a first embodiment of the present invention.
Figure 5B:
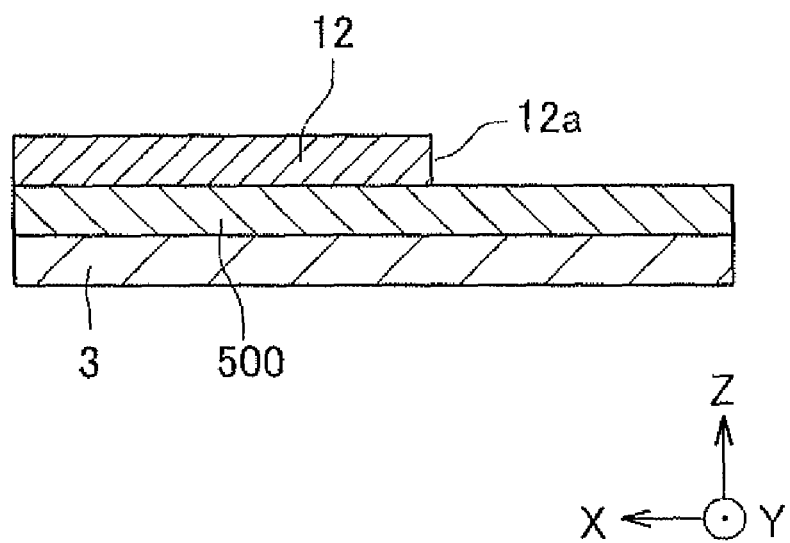
FIG. 5B is a sectional view taken along the B-B plane along the arrow direction in FIG. 5A.
Figure 6A:
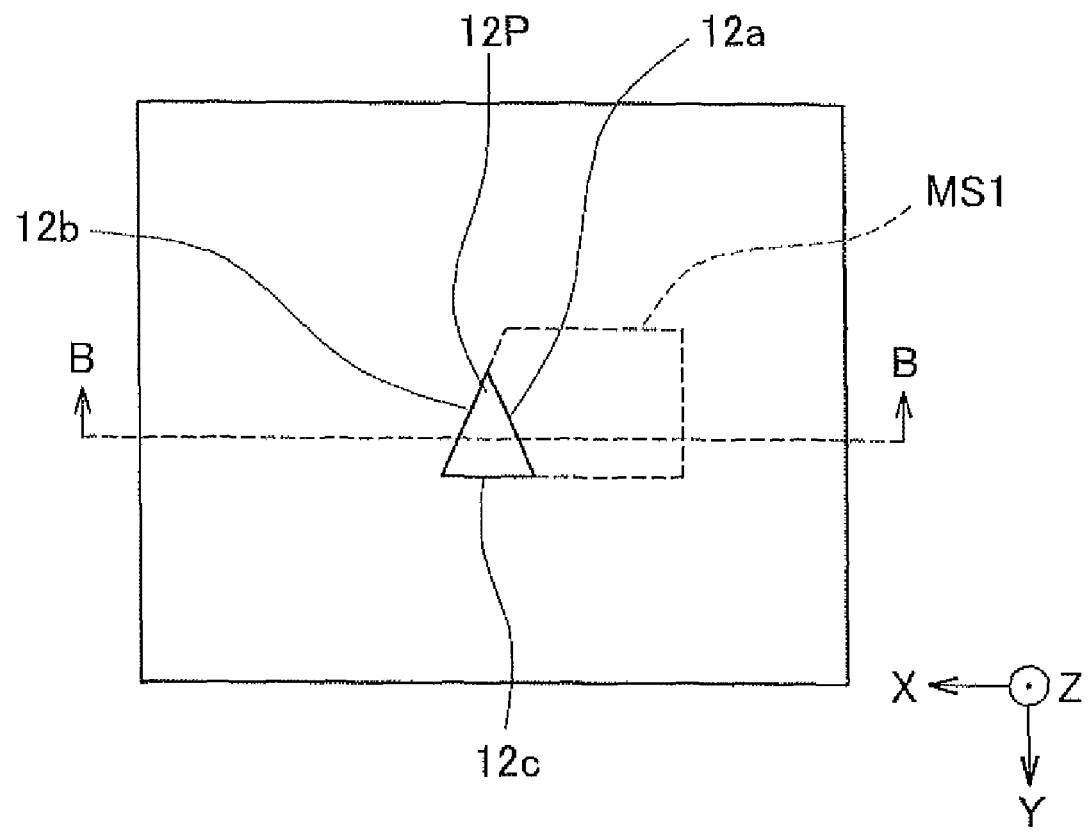
FIG. 6A is a top plan view taken along the X-Y plane to explain a method for producing an element according to a first embodiment of the present invention.
Figure 6B:
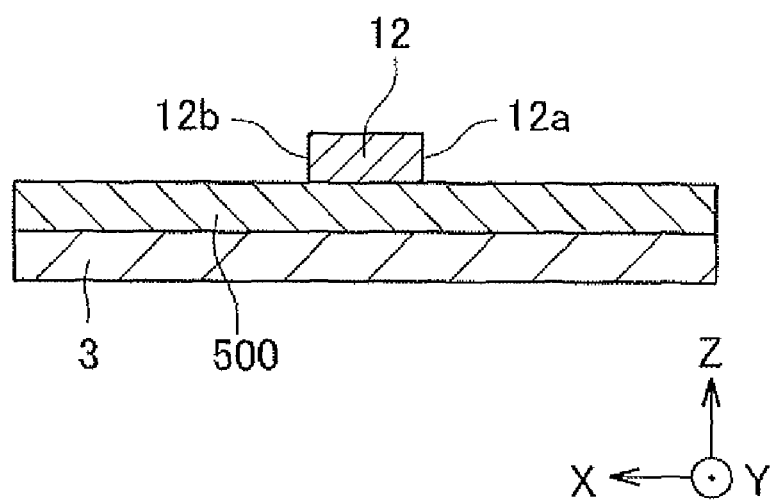
FIG. 6B is a sectional view taken along the B-B plane along the arrow direction in FIG. 6A.
Figure 7A:
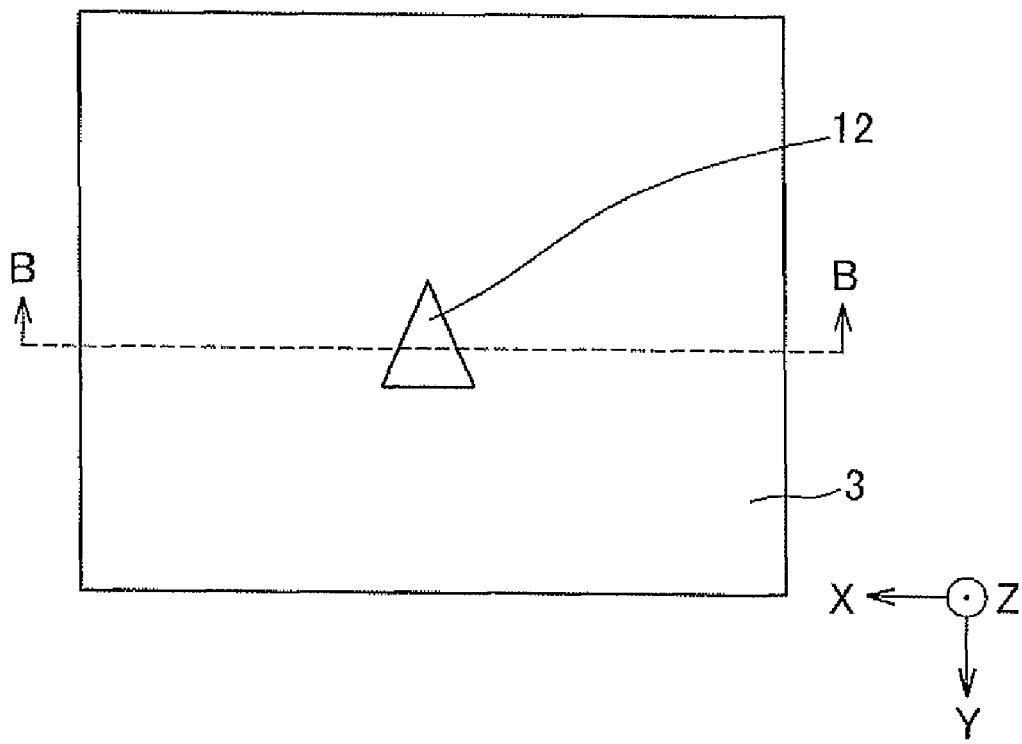
FIG. 7A is a top plan view taken along the X-Y plane to explain a method for producing an element according to a first embodiment of the present invention.
Figure 7B:
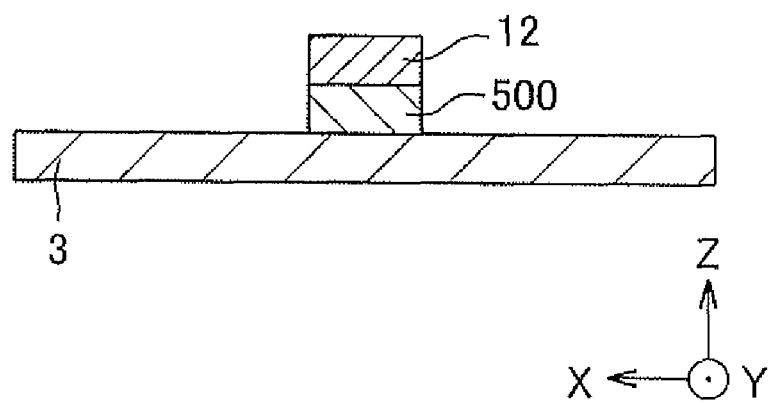
FIG. 7B is a sectional view taken along the B-B plane along the arrow direction in FIG. 7A.
Figure 8A:
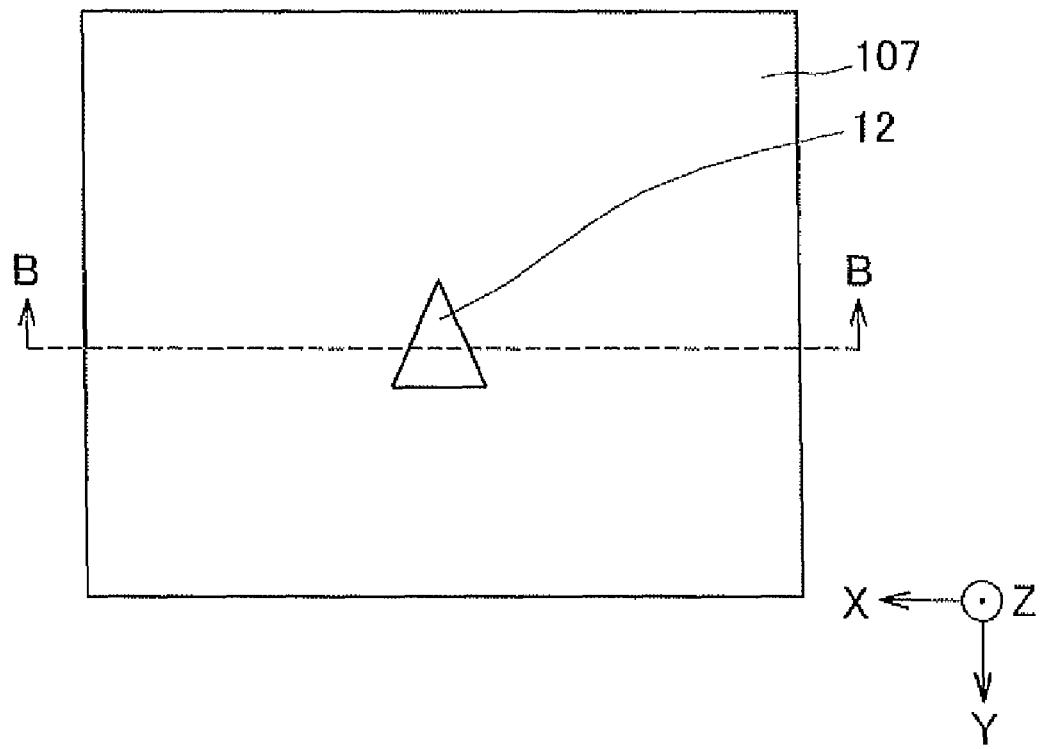
FIG. 8A is a top plan view taken along the X-Y plane to explain a method for producing an element according to a first embodiment of the present invention.
Figure 8B:
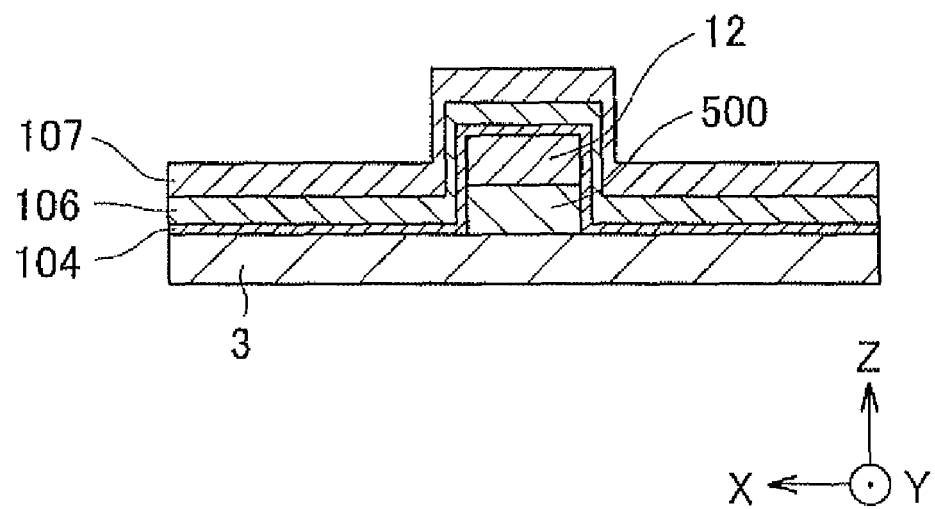
FIG. 8B is a sectional view taken along the B-B plane along the arrow direction in FIG. 8A.
Figure 9A:
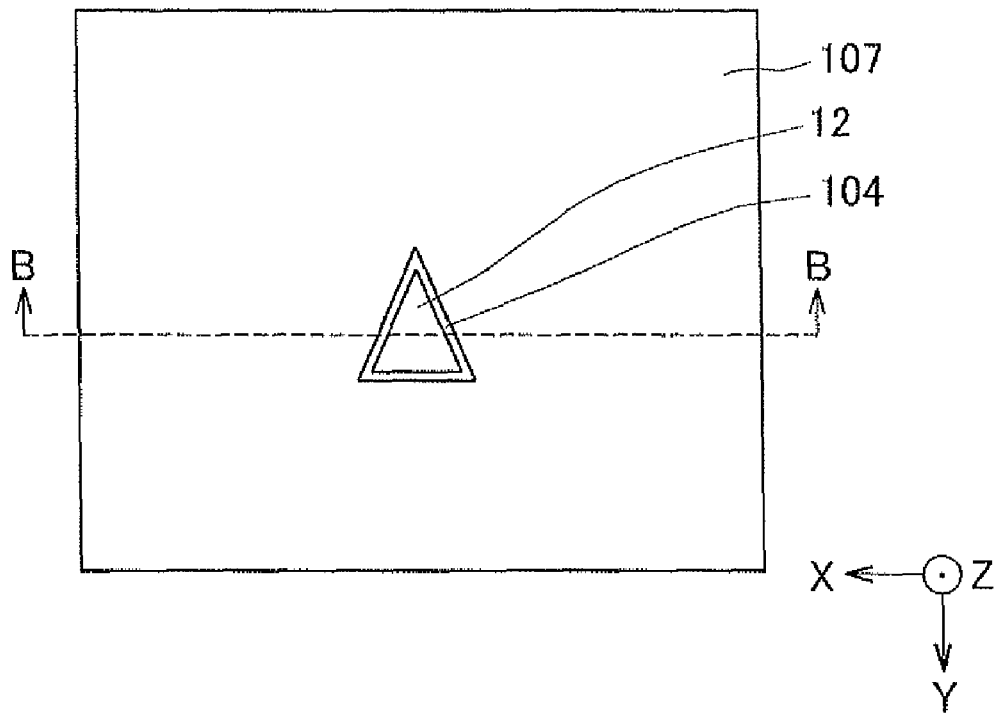
FIG. 9A is a top plan view taken along the X-Y plane to explain a method for producing an element according to a first embodiment of the present invention.
Figure 9B:
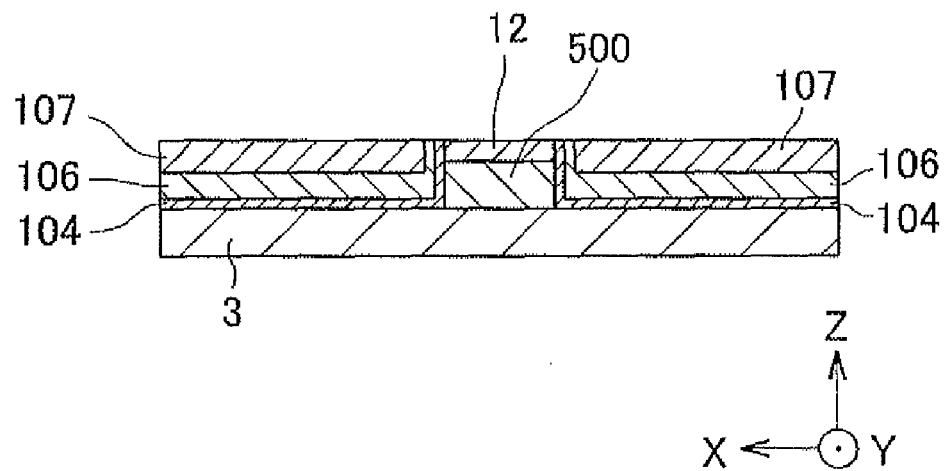
FIG. 9B is a sectional view taken along the B-B plane along the arrow direction in FIG. 9A.
Figure 10A:
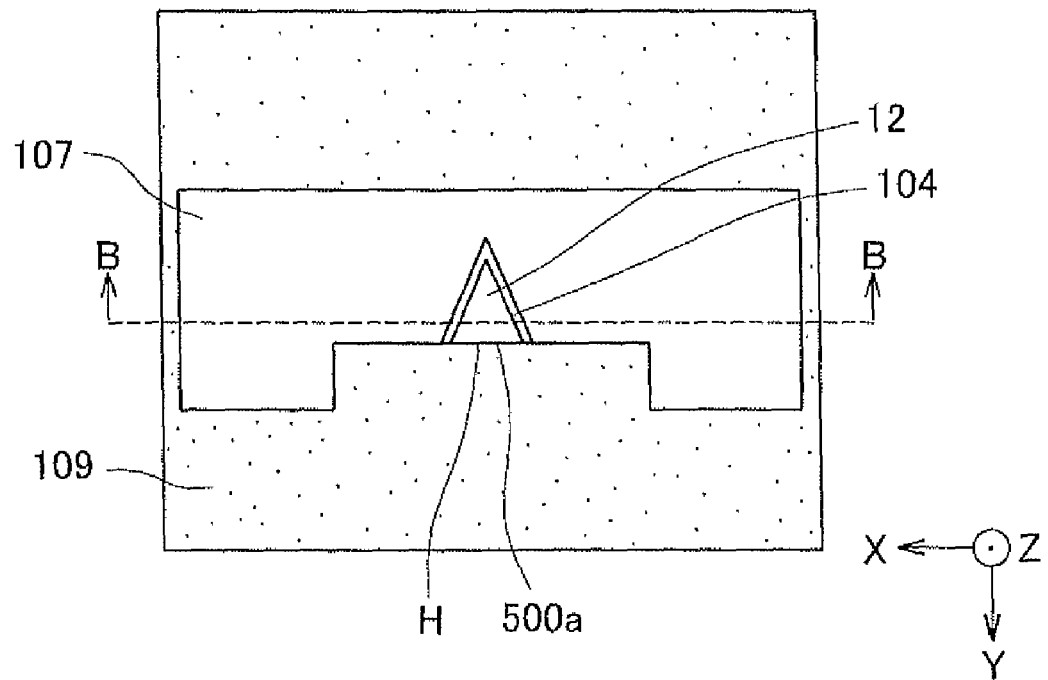
FIG. 10A is a top plan view taken along the X-Y plane to explain a method for producing an element according to a first embodiment of the present invention.
Figure 10B:
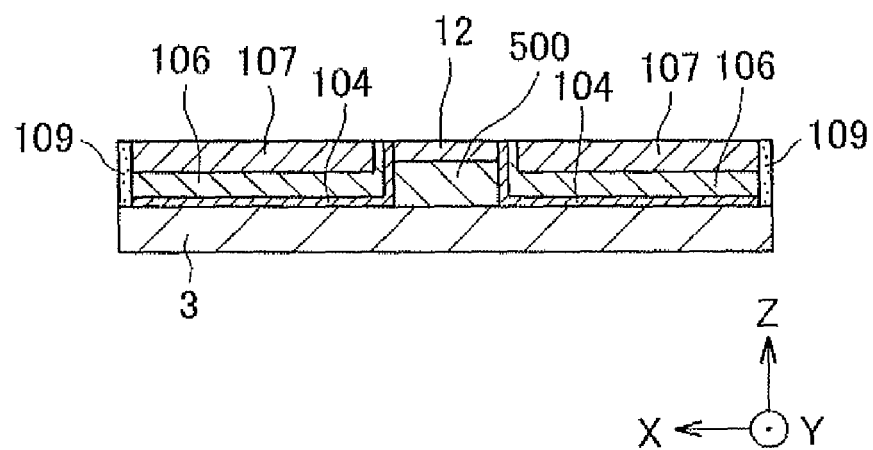
FIG. 10B is a sectional view taken along the B-B plane along the arrow direction in FIG. 10A.
Figure 11A:
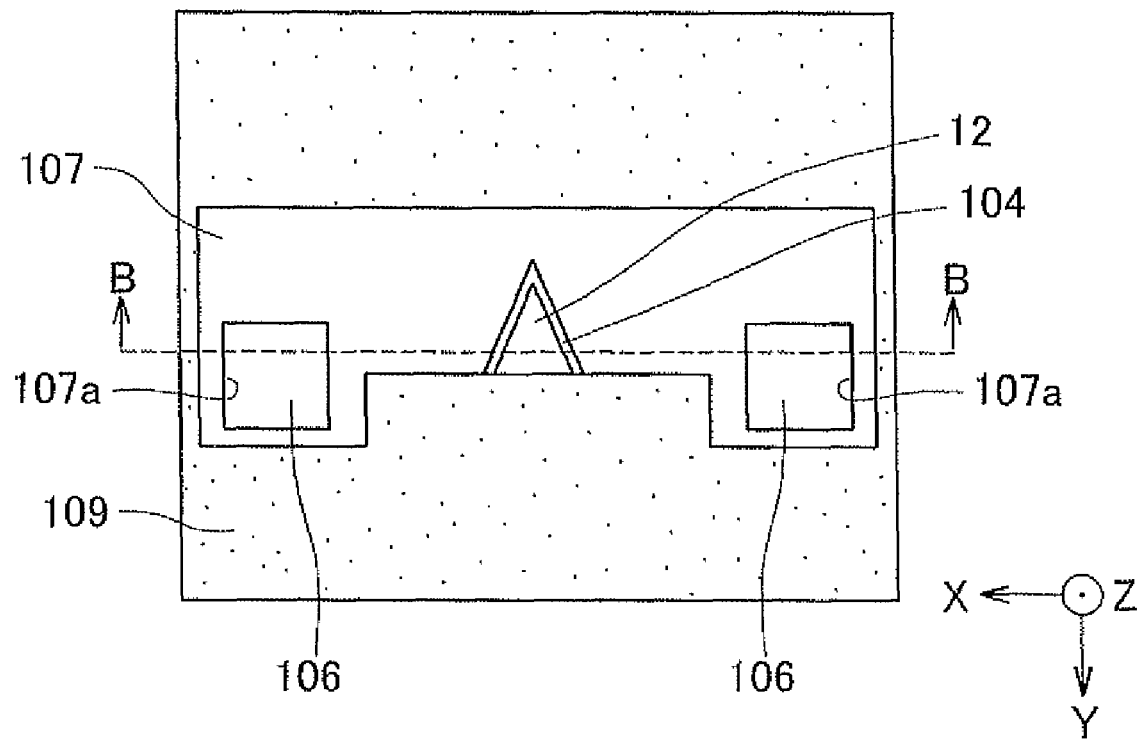
FIG. 11A is a top plan view taken along the X-Y plane to explain a method for producing an element according to a first embodiment of the present invention.
Figure 11B:
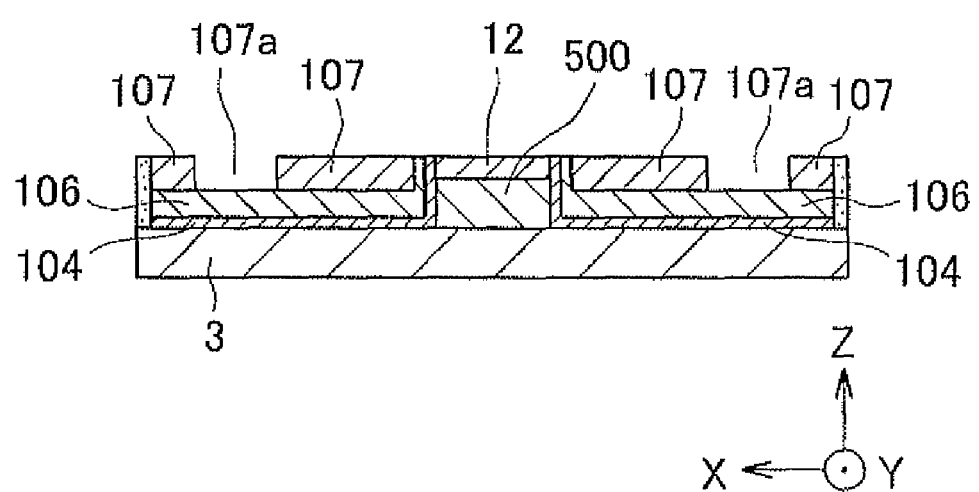
FIG. 11B is a sectional view taken along the B-B plane along the arrow direction in FIG. 11A.

Note that FIG. 4A is an X-Y top plan view, and FIG. 4B is a B-B sectional view along the arrow direction in FIG. 4A. In the same manner, FIG. 5A is an X-Y top plan view, and FIG. 5B is a B-B sectional view along the arrow direction in FIG. 5A. In the same manner, FIG. 6A is an X-Y top plan view, and FIG. 6B is a B-B sectional view along the arrow direction in FIG. 6A. In the same manner, FIG. 7A is an X-Y top plan view, and FIG. 7B is a B-B sectional view along the arrow direction in FIG. 7A. In the same manner, FIG. 8A is an X-Y top plan view, and FIG. 8B is a B-B sectional view along the arrow direction in FIG. 8A. In the same manner, FIG. 9A is an X-Y top plan view, and FIG. 9B is a B-B sectional view along the arrow direction in FIG. 9A. In the same manner, FIG. 10A is an X-Y top plan view, and FIG. 10B is a B-B sectional view along the arrow direction in FIG. 10A. In the same manner, FIG. 11A is an X-Y top plan view, and FIG. 11B is a B-B sectional view along the arrow direction in FIG. 11A.

(1) Step for Forming Magnetic Sensor Multi-Layered Film and (2) Step for Forming Hard Mask Film for Etching As shown in FIGS. 4A and 4B, a magnetic sensor multi-layered film 500 is formed on a lower shield electrode layer 3 (step for forming the magnetic sensor multi-layered film). A hard mask film 12 for etching is formed on the magnetic sensor multi-layered film 500 (step for forming the hard mask film for etching).

The magnetic sensor multi-layered film 500 is configured with at least the first ferromagnetic layer 30, the second ferromagnetic layer 50, and the nonmagnetic intermediate layer 40 that are shown in FIG. 1. In other words, the magnetic sensor multi-layered film 500 can be considered a stack from the under layer 121 through the second ferromagnetic layer 50 as shown in FIG. 1.

The hard mask for etching is made of, for example, Ta, Ru, Cr, or the like. When the hard mask for etching remains as the cap layer 126 (passivation layer 126) shown in FIG. 1, the manufacturing efficiency is improved. A mask that is made of polymer can be used. However, when the mask that is made of polymer is used, it is necessary that the mask is completely removed.

In this embodiment, the hard mask for etching is made of a metal film. The materials and functions of the hard mask is different from a resist mask that is made of polymer, such as photoresist, the resist mask being formed by exposure and development.

(3) Step for First Etching Hard Mask

The hard mask for etching is etched by using a mask (not shown) that is formed by a photoresist method. As a result, a cut surface 12a including one side 12a that configures the vertex angle of the triangle shape is formed as shown in FIGS. 5A and 5B.

(4) Step for Second Etching Hard Mask

A cut surface 12b including another side 12b that forms the vertex angle 12p of the triangle shape is formed as shown in FIGS. 6A and 6B by etching the hard mask for etching formed in the step for first etching the hard mask and by using a mask MS1 formed through the photoresist method, so that a triangular shaped hard mask 12 in which the vertex angle faces the ABS is completely formed. The vertex angle is approximately 20°-160°, preferably 40°-120°.

The base of the triangle shape is identified by a reference numeral 12c (FIG. 6A). When it is seen in two-dimensions, a triangle shape is used. Actually, there is a depth dimension as well, and so it has a triangular prism shape.

When the triangular shaped vertex angle 12p (triangular prism shape) is formed in the present invention, the vertex angle 12p is not formed by a single step but by two steps; first, the cut surface 12a is formed by a step for first etching the hard mask, and second, the cut surface 12b is formed by a step for second etching the hard mask. Because there are two steps to form the vertex angle 12p, the vertex angle 12p is sharp, and forming of a blunt angle is avoided.

(5) Step for Etching Magnetic Sensor Multi-Layered Film into Triangle Shape

The magnetic sensor multi-layered film 500 is etched by using the triangular shaped hard mask 12 as a mask. Then, the stack of the triangular shaped magnetic sensor multi-layered film 500 and the residual triangular shaped hard mask 12 is formed as shown in FIGS. 7A and 7B.

(6) Step for Forming First Insulating Layer, (7) Step for Forming Bias Magnetic Field Application Layer, and (8) Step for Forming Second Insulating Layer As shown in FIGS. 7B, 8A, and 8B, a first insulating layer 104 is formed on the stack of the triangular shaped magnetic sensor multi-layered film 500 and the residual triangular shaped hard mask 12, and on the lower shield electrode layer 3 on which the stack is formed. Then, a bias magnetic field application layer 106 is formed on the first insulating layer 104. And then, a second insulating layer 107 is formed on the bias magnetic field application layer 106.

Through the step for forming the first insulating layer 104, a part surrounded by the first insulating layer 104 exists in the vicinity of the sides of the triangular shaped magnetic sensor multi-layered film 500.

Insulating material, such as alumina, is preferably used for the first insulating layer 104 and the second insulating layer 107. Magnetic material, for example, CoPt and CoCrPt, is preferably used for the bias magnetic field application layer 106.

(9) Step for Processing Planarization

As shown in FIGS. 9A and 9B, a planarization process is performed such that a certain thickness of the residual triangular shaped hard mask 12 remains.

The planarization processes are exemplified by a chemical mechanical polishing (CMP) process in which the planarization is chemically and mechanically performed and by a chemical dissolution process. The CMP process is preferred.

The first insulating layer 104 exists in the vicinity of sides of the triangular shaped magnetic sensor multi-layered film 500 through the planarization process. The first triangular shaped insulating layer 104 that configures an outer frame is formed. The outer frame is similar to an outer circumference of the triangular shaped magnetic sensor multi-layered film 500.

As shown in FIGS. 10A and 10B, after the planarization process, a step for etching is performed for forming an upper shield electrode layer at the same time as regulating the MR height rear part (shown as a line H in FIG. 10A) that is a posterior length of the rear edge part 500a of the magnetic sensor multi-layered film 500. Then, it is preferred to perform a step for refilling the etched portion (concave part) formed by the etching step with an insulating material 109 so that an insulating layer 109 is formed.

(10) Step for Forming Contact Hole in which Contact Hole Leads to Bias Magnetic Field Application Layer As shown in FIGS. 11A and 11B, a step for forming contact holes is performed. Two contact holes 107a that lead to the bias magnetic field application layer 106 are formed by etching a certain location of the second insulating layer 107 at both edges in the width direction (X direction) of the stack of the triangular shaped magnetic sensor multi-layered film 500 and the residual triangular shaped hard mask 12 while the stack is in an approximate center position (regulation position). As a result, the bias magnetic field application layer 106 is exposed at the locations of the two contact holes 107a. The two contact holes 107a are provided in locations to cross the magnetic sensor multi-layered film 500 in the width direction (X direction). The reason for that is clear with consideration for functions (method for measuring resistance) discussed later of the present invention.

(11) Step for Lapping from ABS Side while Measuring Resistance

Figure 12:
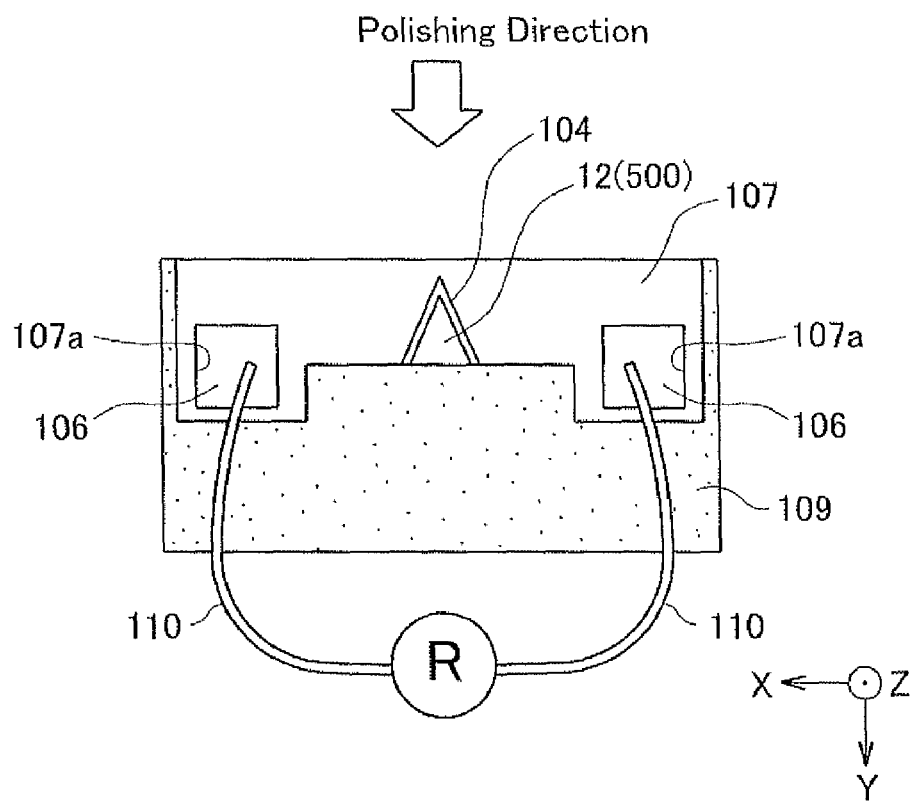
FIG. 12 is a top plan view taken along the X-Y plane to explain a method for producing an element according to a first embodiment of the present invention.

As shown in FIG. 12, conductive wires 110 are drawn from the exposed bias magnetic field application layer 106 through the two contact holes 107a. After the conductive wires 107b connect each other, resistance is ready for measurement.

In FIG. 12, the conduction state is secured because the bias magnetic field application layer 106 as conductive material continuously exists in the vicinity of the vertex angle of the triangular shaped magnetic sensor multi-layered film 500 surrounded by the insulating layer 104. Therefore, resistance that is measured by resistance measuring equipment R is low.

In FIG. 12, a lapping is already started in the Y direction to form the ABS, so that the edge of the lapping is very close to the vicinity of the vertex angle of the triangle of the magnetic sensor multi-layered film 500. In the present invention, when the lapping face is gradually approaching the vertex angle of the triangle shape of the magnetic sensor multi-layered film 500 by lapping from the ABS side, the lapping is controlled through a measurement point in which a resistance value is steeply increased.

Figure 13:
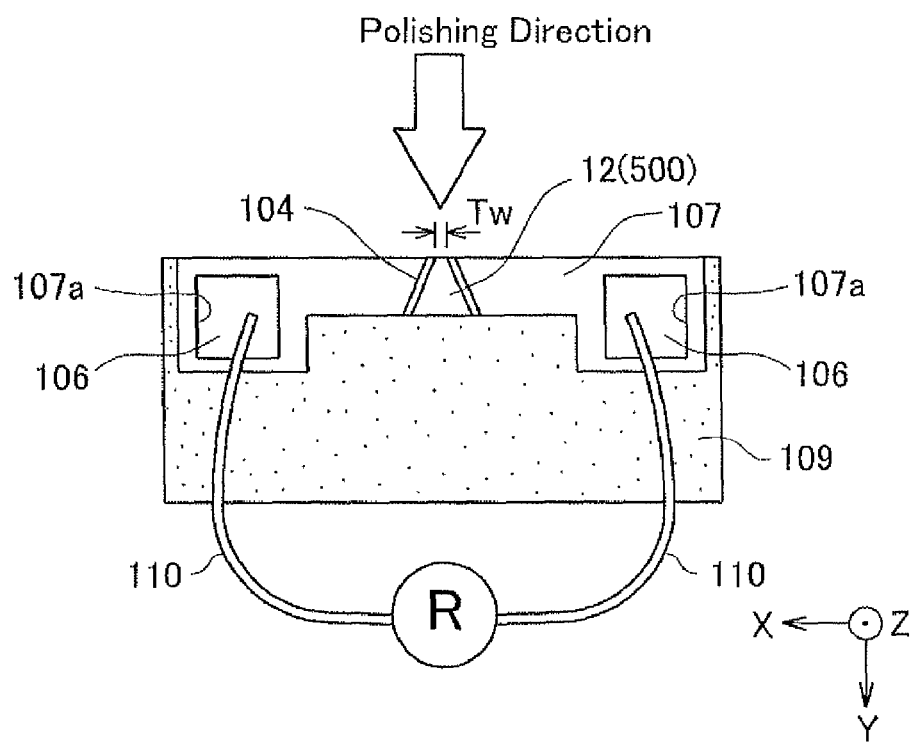
FIG. 13 is a top plan view taken along the X-Y plane to explain a method for producing an element according to a first embodiment of the present invention.

As shown in FIG. 13, when a gap occurs in the bias magnetic field application layer 106 through finally cutting a tip of the vertex angle of the triangle shape during the lapping in the Y direction, the bias magnetic field application layer 106 is in the nonconductive state, so that the resistance value measured by the resistance measuring equipment R is steeply increased. In the present invention, the following lapping operation is stopped by using the measurement point in which the resistance value is steeply increased. Specifically, the lapping operation is stopped after a certain time, which is predetermined in relation to the lapping speed, has elapsed from the measurement point in which the resistance value is steeply increased.

The reason for "after a certain time has elapsed" is that a time for which the tip of the vertex angle of the magnetic sensor multi-layered film 500 is certainly cut off is counted in consideration of the thickness of the insulating layer 104. A desired track width Tw is regulated by the exposed width (X direction) that is created by cutting off the tip of the vertex angle of the magnetic sensor multi-layered film 500. When the certain time discussed above is decided, for example, data for the lapping time (T) from the measurement point in which the resistance value is steeply increased and the track width Tw by the lapping are obtained in advance in consideration of the lapping speed.

Because the track width Tw formed by the above process is 10-35 nm, preferably 10-25 nm, more preferably 10-20 nm, the track width Tw is an ultra narrow one that exceeds limits of photolithography technology. The ultra narrow track can be securely and constantly formed because the operation is performed while the resistance value is measured. There is an effect that a dummy resistance pattern that is additionally formed in the vicinity of an element in the past with respect to the ABS lapping is omitted (for example in Japanese laid-open patent application publication number 2003-133615).

Figure 14:
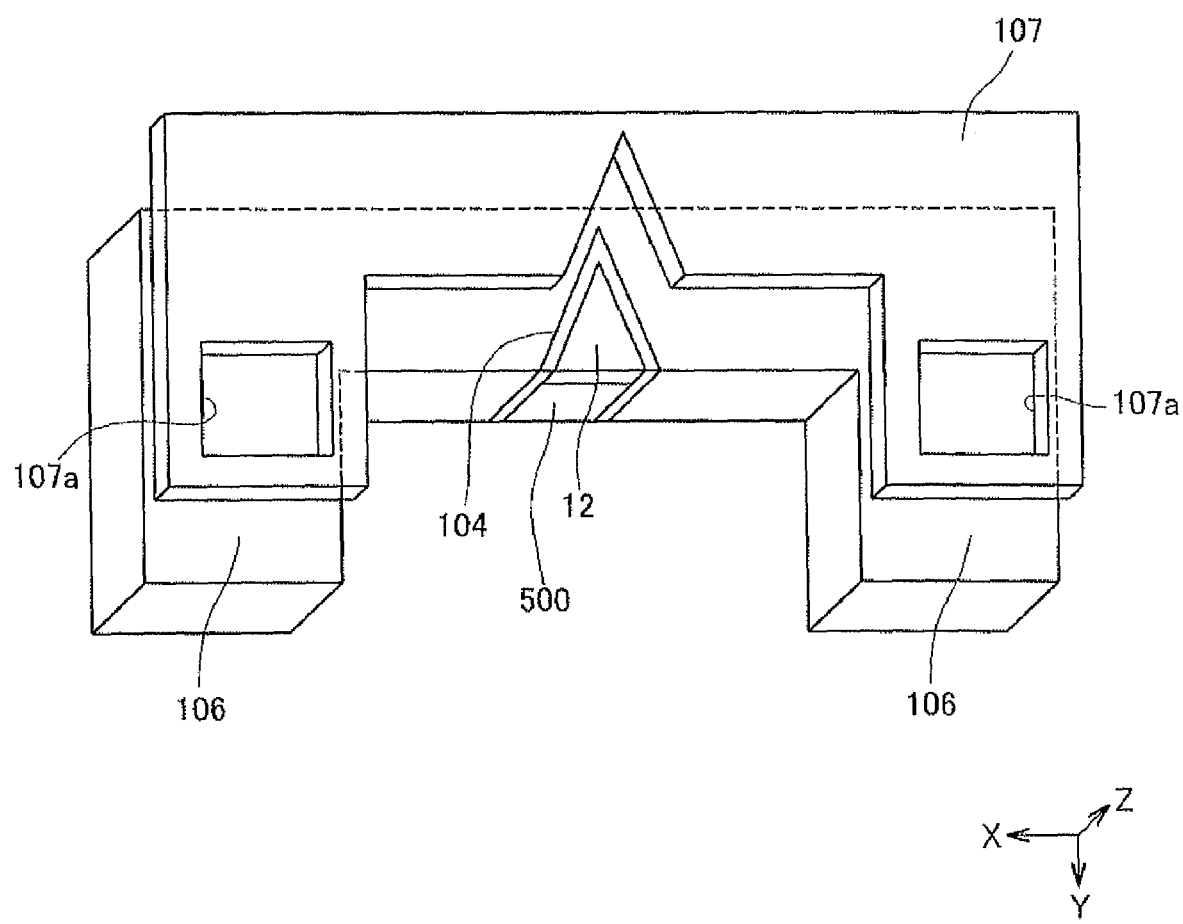
FIG. 14 is a perspective view of primary parts of FIG. 12 to show the state of FIG. 12 for easy understanding.

FIG. 14 is a perspective view of primary parts of FIG. 12 to show the state of FIG. 12 for easy understanding. In FIG. 14, the second insulating layer 107 is drawn in a partially exploded manner for easy understanding of the primary parts. Further in FIG. 14, the insulating layer 109 that is refilled in FIG. 12 is omitted.

[Explanation of Method for Producing According to Second Embodiment]

Next, a second embodiment according to the present invention is explained.

A method for producing a thin film magnetic head as a second embodiment that has an MR element according to the present invention is configured with the following steps: (1) step for forming a magnetic sensor multi-layered film; (2) step for forming a photoresist film; (3) step for a first exposure; (4) step for a second exposure; (5) step for development; (6) step for etching the magnetic sensor multi-layered film into a polygonal shape (triangle shape); (7) step for forming a first insulating layer; (8) step for forming a bias magnetic field application layer; (9) step for forming a second insulating layer; (10) step for processing planarization; (11) step for removing a photoresist mask; (12) step for forming contact holes in which two contact holes lead to the bias magnetic field application layer; and (13) step for lapping while measuring resistance.

Each of these steps is explained below in detail with reference to FIGS. 15-23.

Figure 15A:
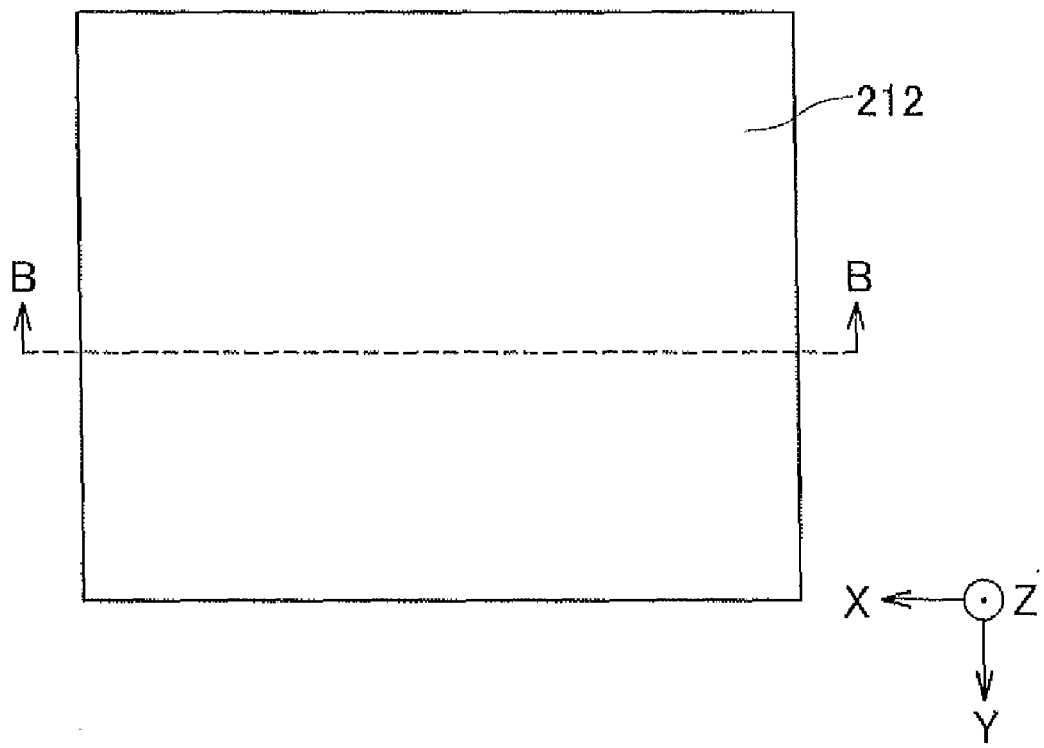
FIG. 15A is a top plan view taken along the X-Y plane to explain a method for producing an element according to a second embodiment of the present invention.
Figure 15B:
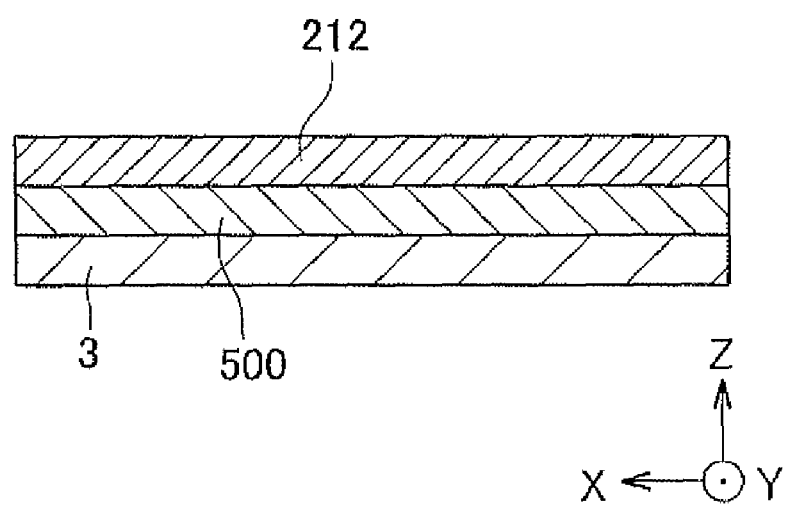
FIG. 15B is a sectional view taken along the B-B plane along the arrow direction in FIG. 15A.
Figure 16A:
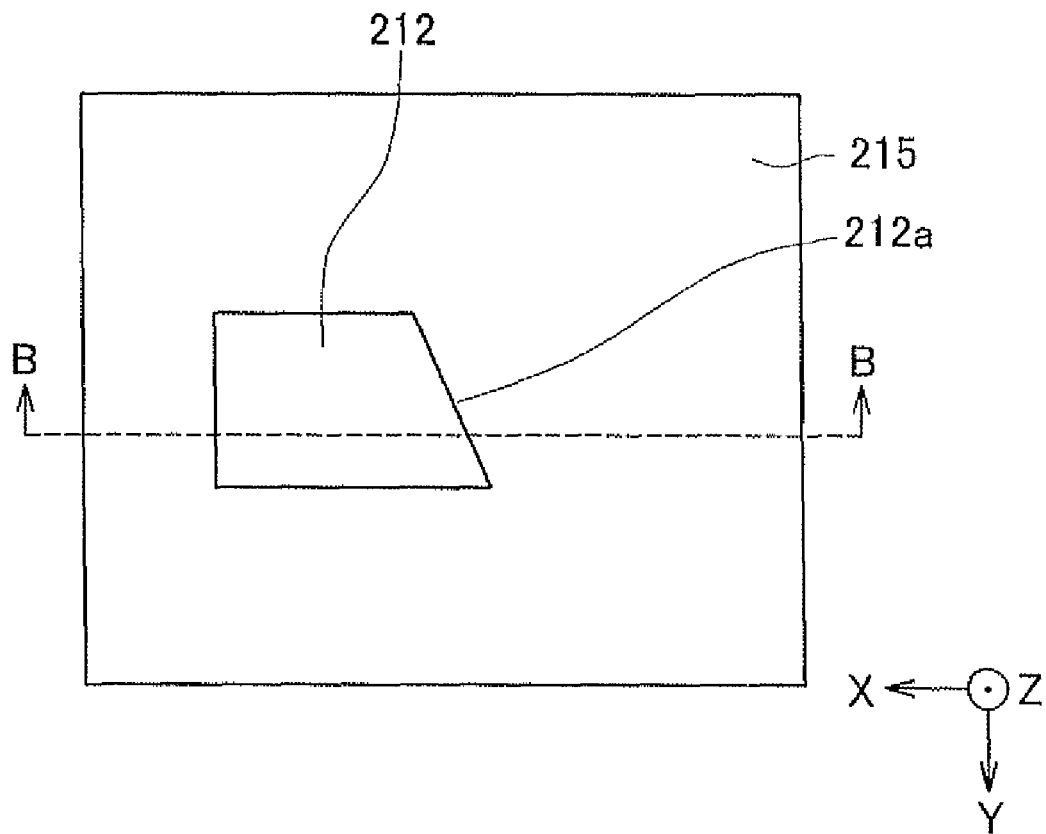
FIG. 16A is a top plan view taken along the X-Y plane to explain a method for producing an element according to a second embodiment of the present invention.
Figure 16B:
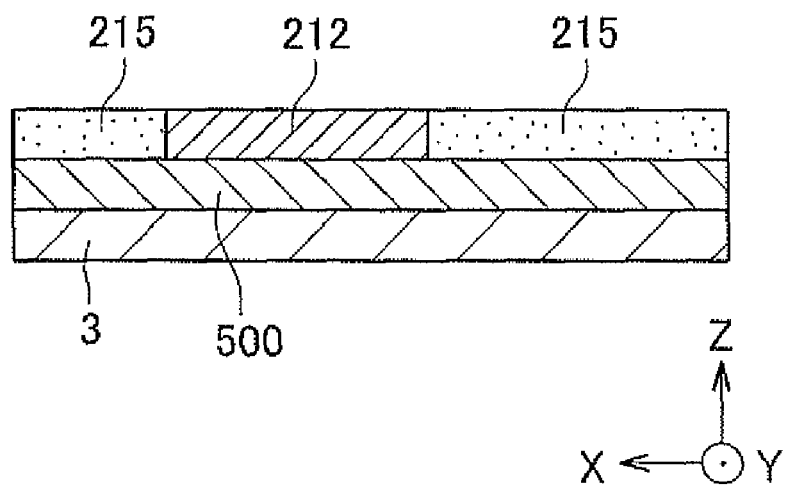
FIG. 16B is a sectional view taken along the B-B plane along the arrow direction in FIG. 16A.
Figure 17A:
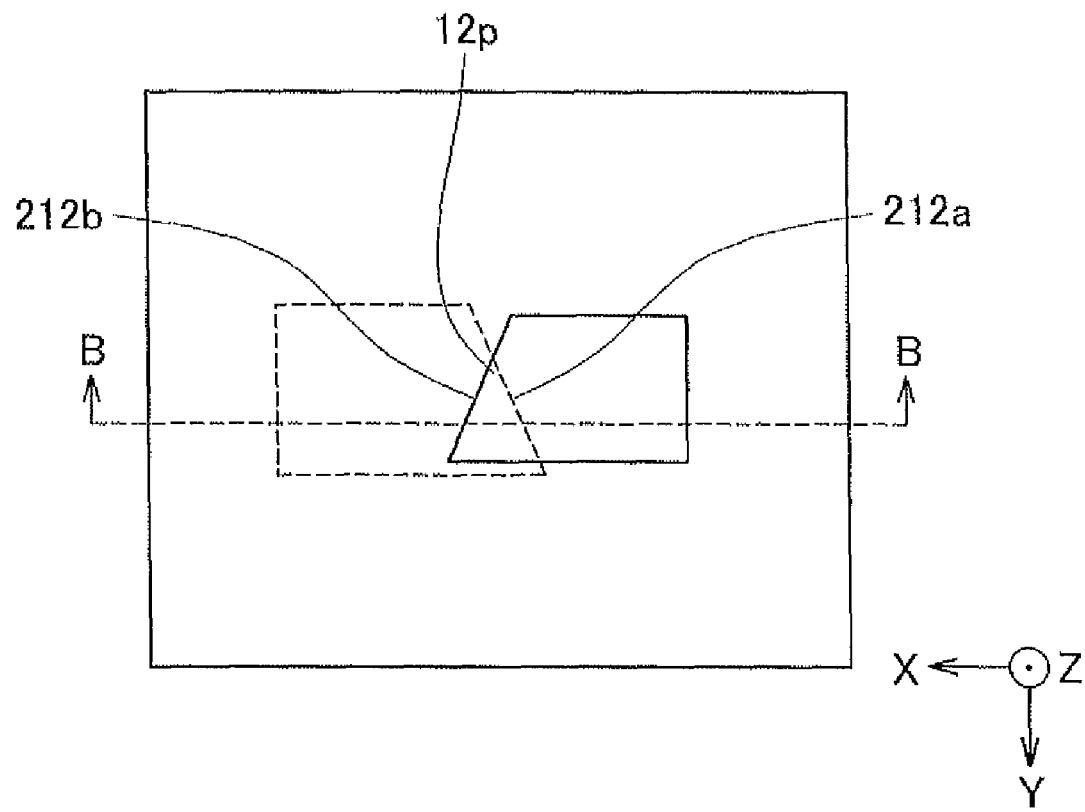
FIG. 17A is a top plan view taken along the X-Y plane to explain a method for producing an element according to a second embodiment of the present invention.
Figure 17B:
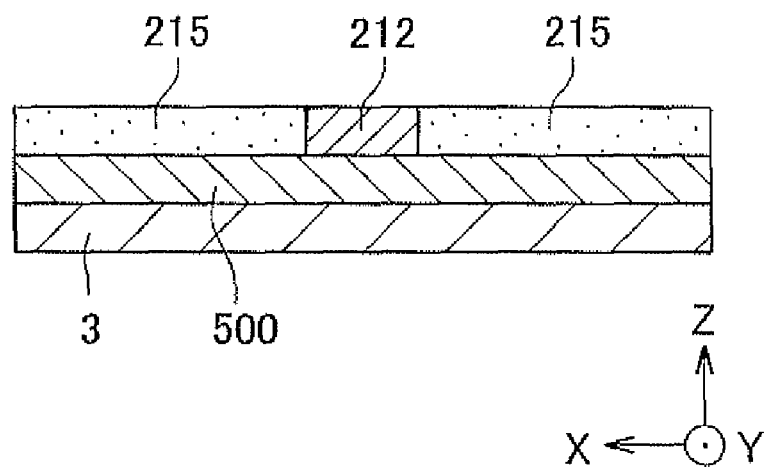
FIG. 17B is a sectional view taken along the B-B plane along the arrow direction in FIG. 17A.
Figure 18A:
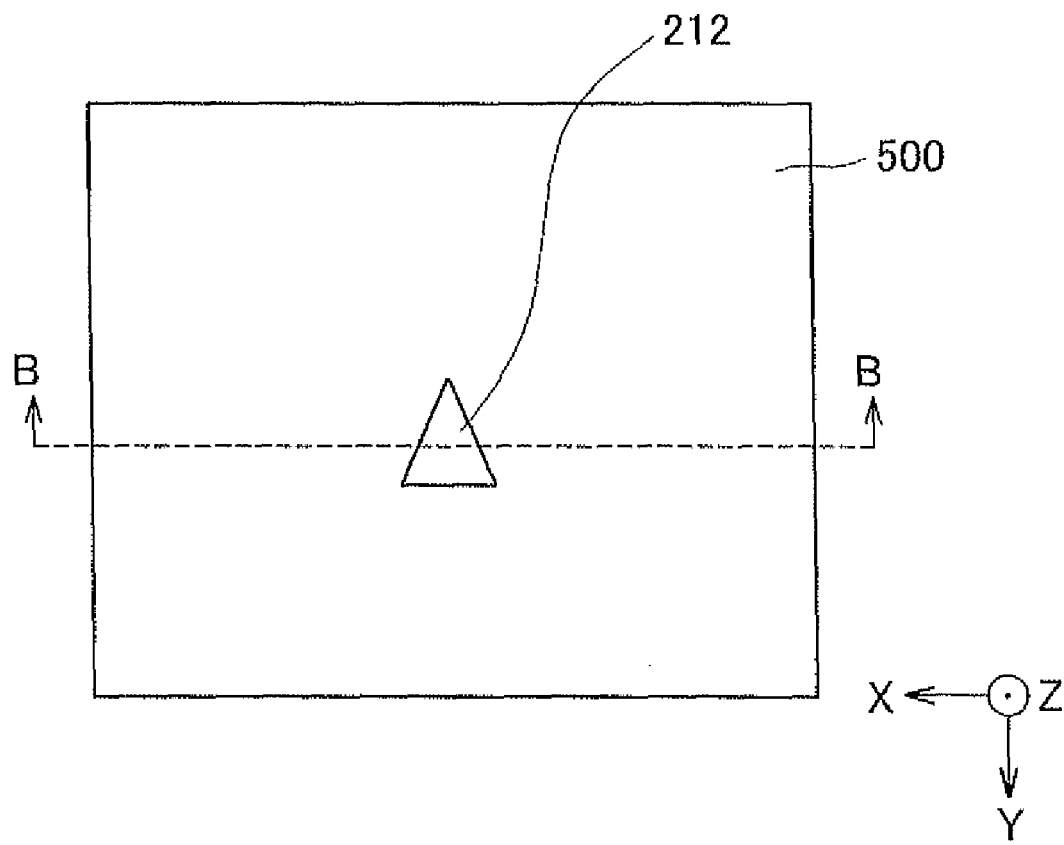
FIG. 18A is a top plan view taken along the X-Y plane to explain a method for producing an element according to a second embodiment of the present invention.
Figure 18B:
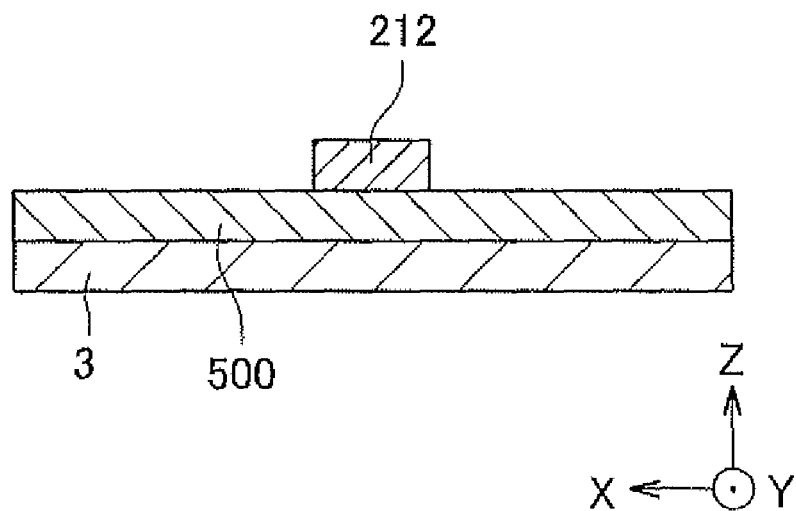
FIG. 18B is a sectional view taken along the B-B plane along the arrow direction in FIG. 18A.
Figure 19A:
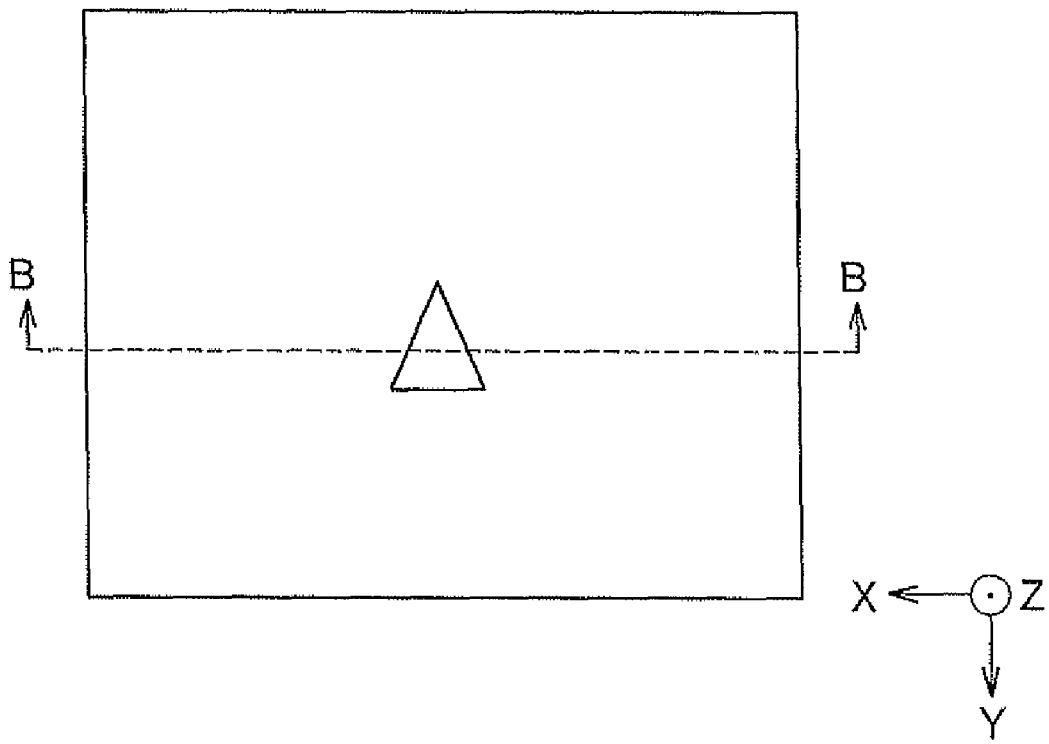
FIG. 19A is a top plan view taken along the X-Y plane to explain a method for producing an element according to a second embodiment of the present invention.
Figure 19B:
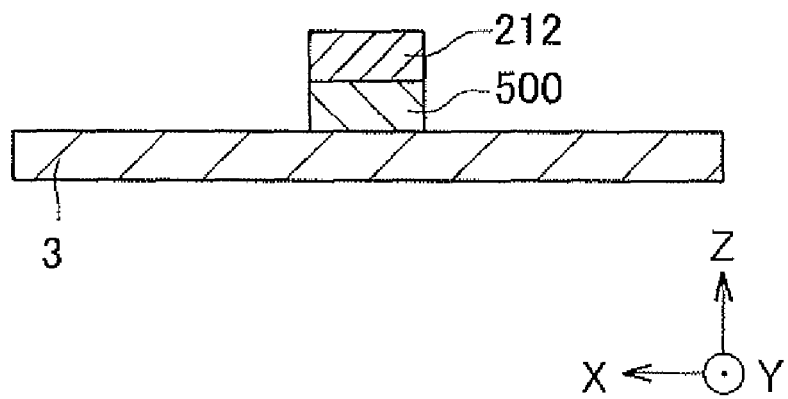
FIG. 19B is a sectional view taken along the B-B plane along the arrow direction in FIG. 19A.
Figure 20A:
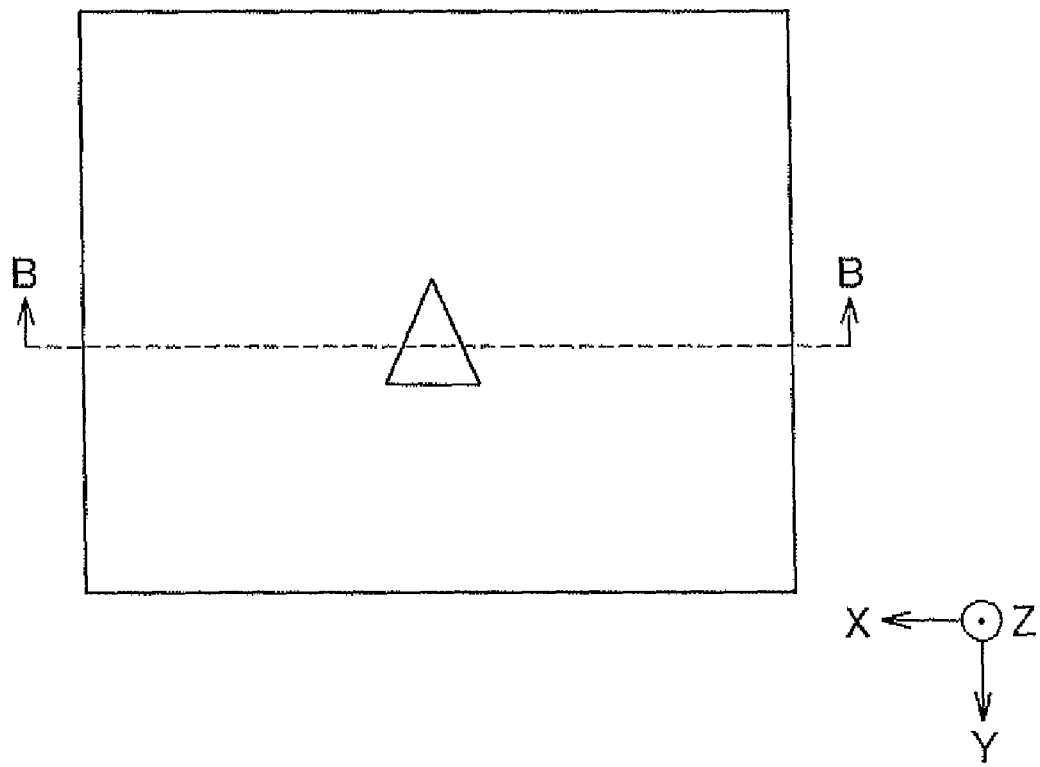
FIG. 20A is a top plan view taken along the X-Y plane to explain a method for producing an element according to a second embodiment of the present invention.
Figure 20B:
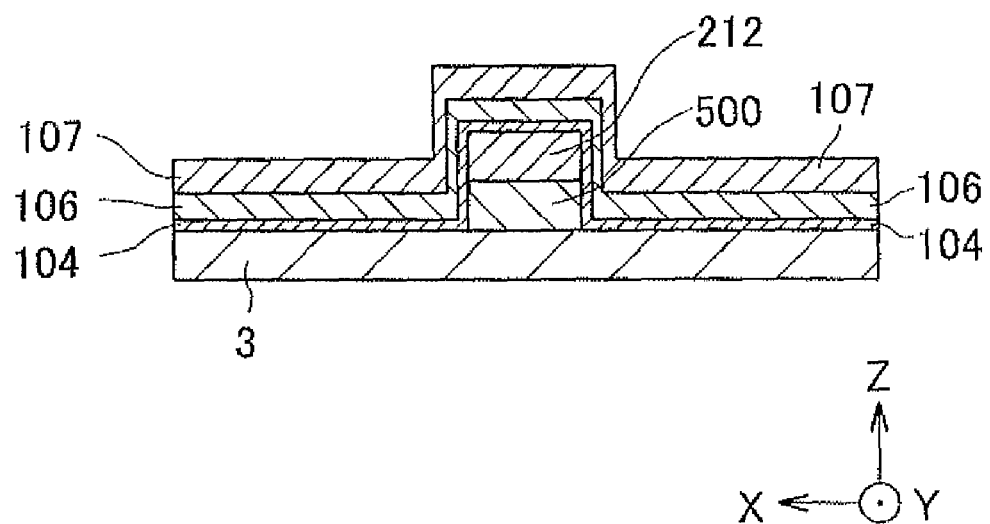
FIG. 20B is a sectional view taken along the B-B plane along the arrow direction in FIG. 20A.
Figure 21A:
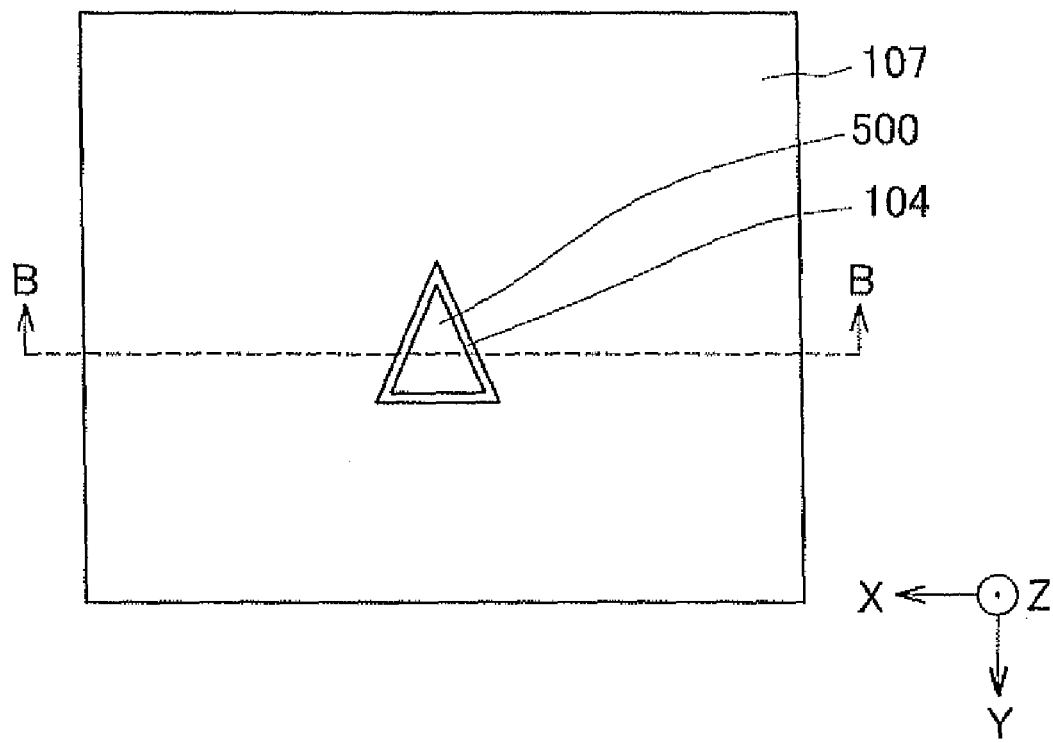
FIG. 21A is a top plan view taken along the X-Y plane to explain a method for producing an element according to a second embodiment of the present invention.
Figure 21B:
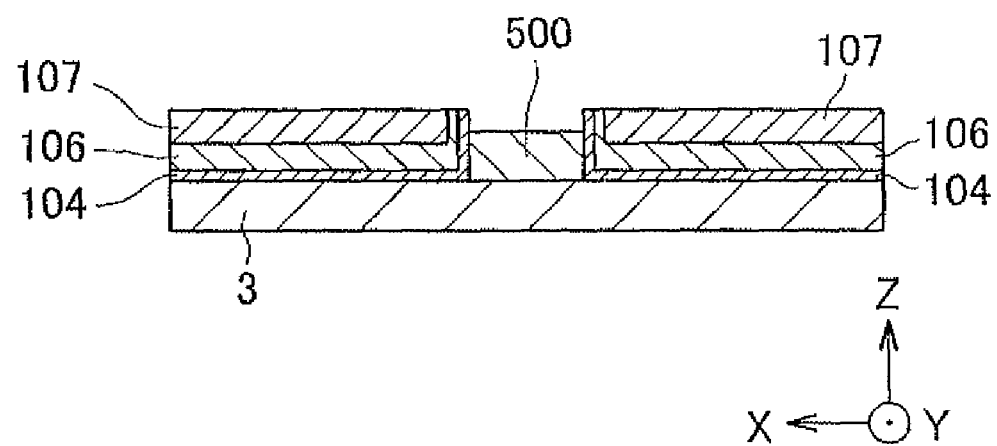
FIG. 21B is a sectional view taken along the B-B plane along the arrow direction in FIG. 21A.
Figure 22A:
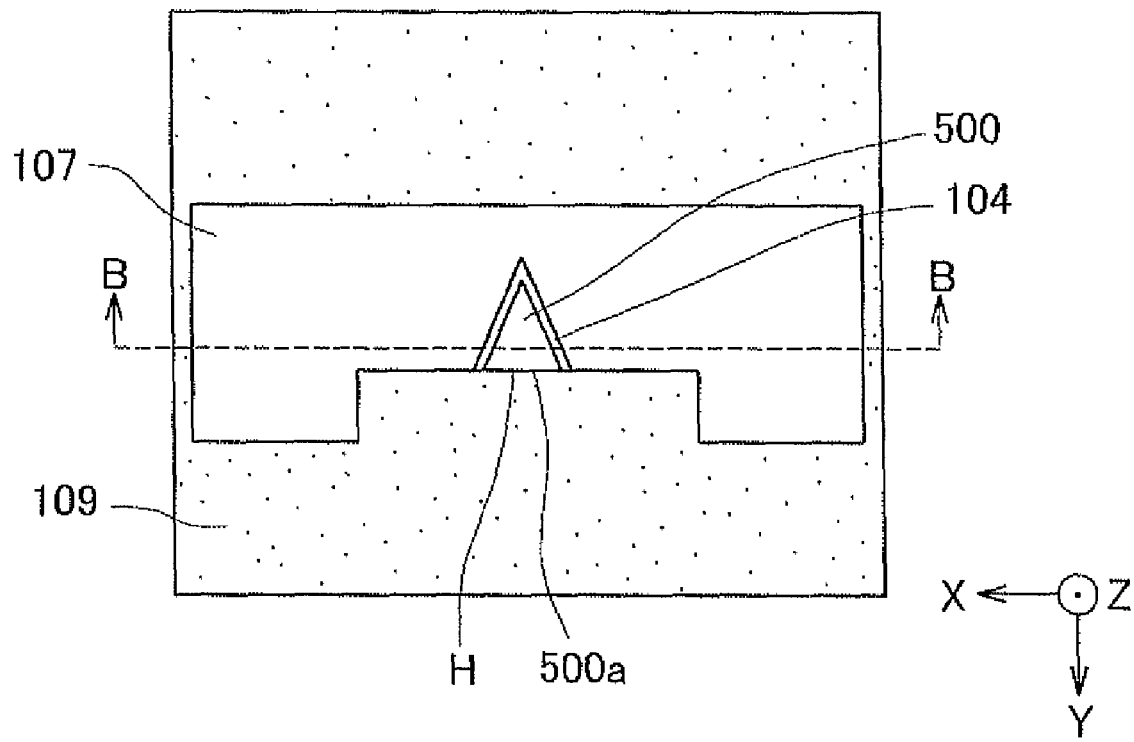
FIG. 22A is a top plan view taken along the X-Y plane to explain a method for producing an element according to a second embodiment of the present invention.
Figure 22B:
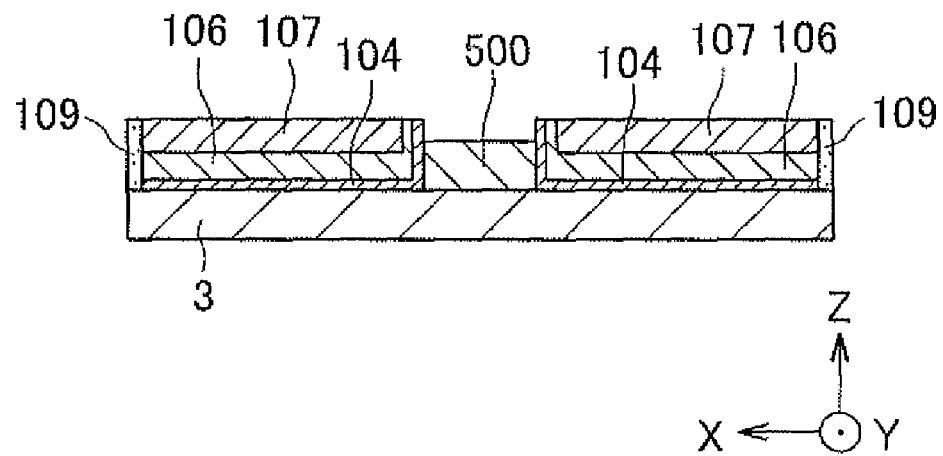
FIG. 22B is a sectional view taken along the B-B plane along the arrow direction in FIG. 22A.
Figure 23A:
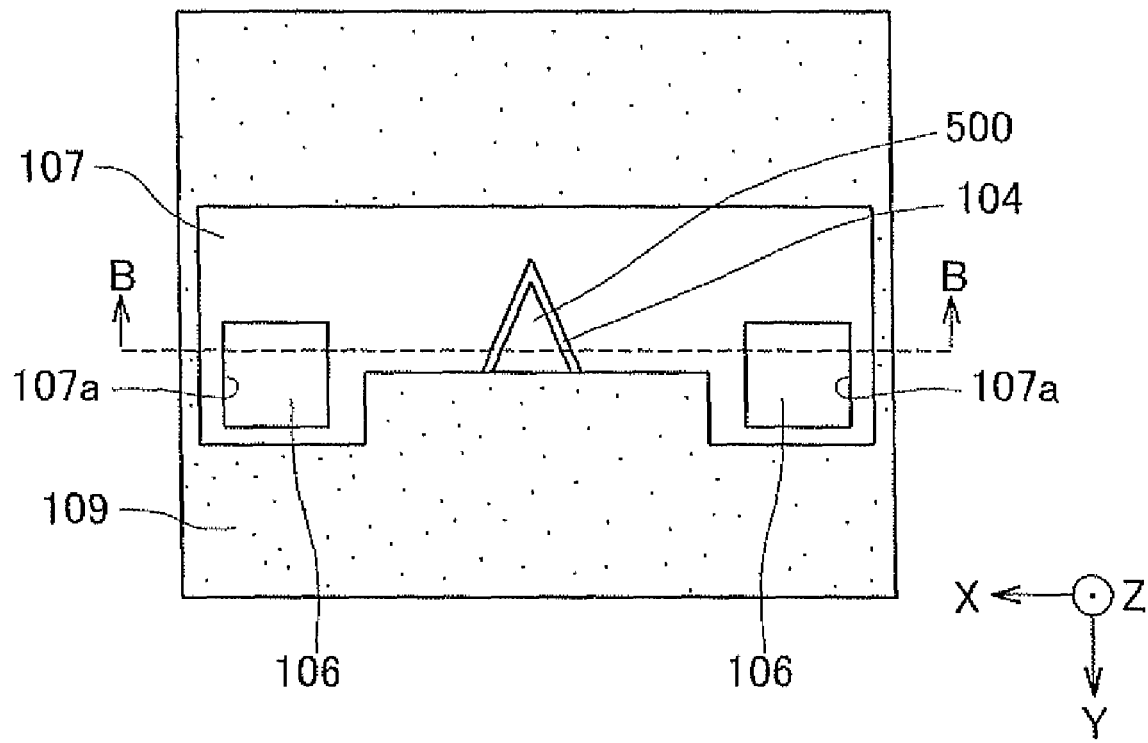
FIG. 23A is a top plan view taken along the X-Y plane to explain a method for producing an element according to a second embodiment of the present invention.
Figure 23B:
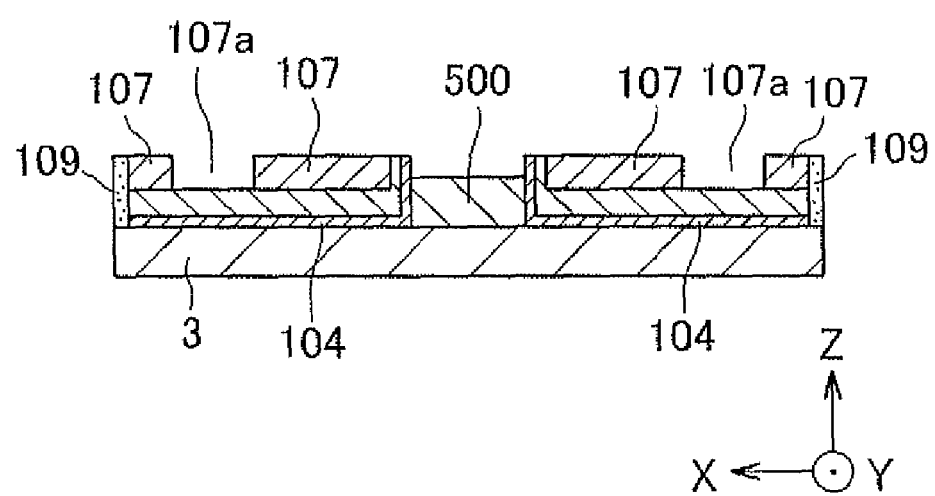
FIG. 23B is a sectional view taken along the B-B plane along the arrow direction in FIG. 23A.

Note that FIG. 15A is an X-Y top plan view, and FIG. 15B is a B-B sectional view along the arrow direction in FIG. 15A. In the same manner, FIG. 16A is an X-Y top plan view, and FIG. 16B is a B-B sectional view along the arrow direction in FIG. 16A. In the same manner, FIG. 17A is an X-Y top plan view, and FIG. 17B is a B-B sectional view along the arrow direction in FIG. 17A. In the same manner, FIG. 18A is an X-Y top plan view, and FIG. 18B is a B-B sectional view along the arrow direction in FIG. 18A. In the same manner, FIG. 19A is an X-Y top plan view, and FIG. 19B is a B-B sectional view along the arrow direction in FIG. 19A. In the same manner, FIG. 20A is an X-Y top plan view, and FIG. 20B is a B-B sectional view along the arrow direction in FIG. 20A. In the same manner, FIG. 21A is an X-Y top plan view, and FIG. 21B is a B-B sectional view along the arrow direction in FIG. 21A. In the same manner, FIG. 22A is an X-Y top plan view, and FIG. 22B is a B-B sectional view along the arrow direction in FIG. 22A. In the same manner, FIG. 23A is an X-Y top plan view, and FIG. 23B is a B-B sectional view along the arrow direction in FIG. 23A.

(1) Step for Forming Magnetic Sensor Multi-Layered Film and (2) Step for Forming Photoresist Film As shown in FIGS. 15A and 15B, a magnetic sensor multi-layered film 500 is formed on a lower shield electrode layer 3 (step for forming the magnetic sensor multi-layered film). A photoresist film 212 is formed on the magnetic sensor multi-layered film 500 (step for forming the photoresist film).

The magnetic sensor multi-layered film 500 is configured with at least the first ferromagnetic layer 30, the second ferromagnetic layer 50, and the nonmagnetic intermediate layer 40 that are shown in FIG. 1. In other words, the magnetic sensor multi-layered film 500 can be considered as a stack that is configured layers from the under layer 121 through the second ferromagnetic layer 50 as shown in FIG. 1.

The photoresist film is a resin film and is different from a metal film. After the photoresist film is hardened (exposed), it is used as a polymer film. It is preferred that the polymer film has a high anti-etching characteristic.

(3) Step for First Exposure

As shown in FIGS. 16A and 16B, after a mask is applied with respect to the photoresist film 212 for making a latent image for a cut surface 212a including one side 212a that configures the vertex angle of the triangle shape, a first exposure is performed. As a result of the first exposure, an area indicated by the reference numeral 215 can be dissolved and removed through development.

(4) Step for Second Exposure

A step for the first exposure is followed by the step discussed below. As shown in FIGS. 17A and 17B, after a mask is applied with respect to the photoresist film 212 for making a latent image that is for a cut surface 212b including another side 212b that configures the vertex angle of the triangle shape and that is for the triangle shape in which the vertex angle 12p faces the ABS, a second exposure is performed. As a result of the second exposure, an area indicated by the reference numeral 215 except the triangle shape can be dissolved and removed through a development.

(5) Step for Development

Steps for the first and second exposures are followed by the step discussed below. As shown in FIGS. 18A and 18B, a development process is performed so that the triangular shaped photoresist film remains.

(6) Step for Etching Magnetic Sensor Multi-Layered Film into Polygonal Shape (Triangle Shape)

The magnetic sensor multi-layered film 500 is etched by using the triangular shaped photoresist film 212 as a mask for etching (resist mask). Then, a stack of the triangular shaped magnetic sensor multi-layered film 500 and the residual triangular shaped photoresist film (resist mask) 212 is formed as shown in FIGS. 19A and 19B.

(7) Step for Forming First Insulating Layer, (8) Step for Forming Bias Magnetic Field Application Layer, and (9) Step for Forming Second Insulating Layer As shown in FIGS. 19B, 20A, and 20B, a first insulating layer 104 is formed on the stack of the triangular shaped magnetic sensor multi-layered film 500 and the residual triangular shaped photoresist film 212, and on the lower shield electrode layer 3 on which the stack is formed. Then, a bias magnetic field application layer 106 is formed on the first insulating layer 104. And then, a second insulating layer 107 is formed on the bias magnetic field application layer 106.

A part surrounded by the first insulating layer 104 exists in the vicinity of sides of the triangular shaped magnetic sensor multi-layered film 500 through step for forming the first insulating layer 104.

Insulating material, such as alumina, is preferably used for the first insulating layer 104 and the second insulating layer 107. Magnetic material, for example, CoPt and CoCrPt, is preferably used for the bias magnetic field application layer 106.

(10) Step for Processing Planarization and (11) Step for Removing Resist Mask

As shown in FIGS. 21A and 21B, a planarization process is performed until a certain thickness of the residual triangular shaped photoresist film (resist mask) 212 remains, and then a step for removing a resist mask in which the photoresist film (resist mask) 212 is performed.

The planarization processes are exemplified by a chemical mechanical polishing (CMP) process in which the planarization is chemically and mechanically performed and by a chemical dissolution process. The CMP process is preferred.

The first insulating layer 104 exists in the vicinity of sides of the triangular shaped magnetic sensor multi-layered film 500 through the planarization process. The first triangular shaped insulating layer 104 that configures an outer frame is formed. The outer frame is similar to an outer circumference of the triangular shaped magnetic sensor multi-layered film 500.

In step for removing the resist mask, a liftoff process, for example, can be used to remove the photoresist film (resist mask) 212.

As shown in FIGS. 22A and 22B, after the steps for processing planarization and for removing the resist mask, a step for etching is performed for forming an upper shield electrode layer at the same time as regulating the MR height rear part (shown as a line H in FIG. 22A) that is a posterior length of the rear edge part 500a of the magnetic sensor multi-layered film 500. Then, it is preferred to perform a step for refilling the etched portion (concave part) formed by the etching step with an insulating material 109 so that an insulating layer 109 is formed.

(12) Step for Forming Contact Holes in which Two Contact Holes Lead to Bias Magnetic Field Application Layer As shown in FIGS. 23A and 23B, a step for forming contact holes is performed. Two contact holes 107a that lead to the bias magnetic field application layer 106 are formed by etching a certain location of the second insulating layer 107 at both edges in the width direction (X direction) of the triangular shaped magnetic sensor multi-layered film 500 while the magnetic sensor multi-layered film 500 is in an approximate center position (regulation position). As a result, the bias magnetic field application layer 106 is exposed at the locations of the two contact holes 107a. The two contact holes 107a are provided in locations to cross the magnetic sensor multi-layered film 500 in the width direction (X direction).

(13) Step for Lapping from ABS Side while Measuring Resistance

This step is same as the step for lapping from the ABS side while measuring resistance in the first embodiment discussed above. Therefore, the explanation is omitted here. See FIGS. 12, 13, and 14.

A thin film magnetic head having an MR element that is formed through steps discussed above is assembled to a head gimbal assembly and a hard disk device.

Examples of a head gimbal assembly and a hard disk device are briefly explained below.

[Explanation of Head Gimbal Assembly and Hard Disk Device]

A slider 210 equipped with a head gimbal assembly is explained with reference to FIG. 24. In the hard disk device, the slider 210 is opposed to a hard disk that is a rotatably driven disk-like recording medium. The slider 210 is provided with a base substrate 211 mainly configured of a substrate and an overcoat.

The base substrate 211 is substantially hexahedronal. Of the six surfaces of the base substrate 211, one surface is opposed to the hard disk. The ABS 70 is formed on this surface.

Figure 24:
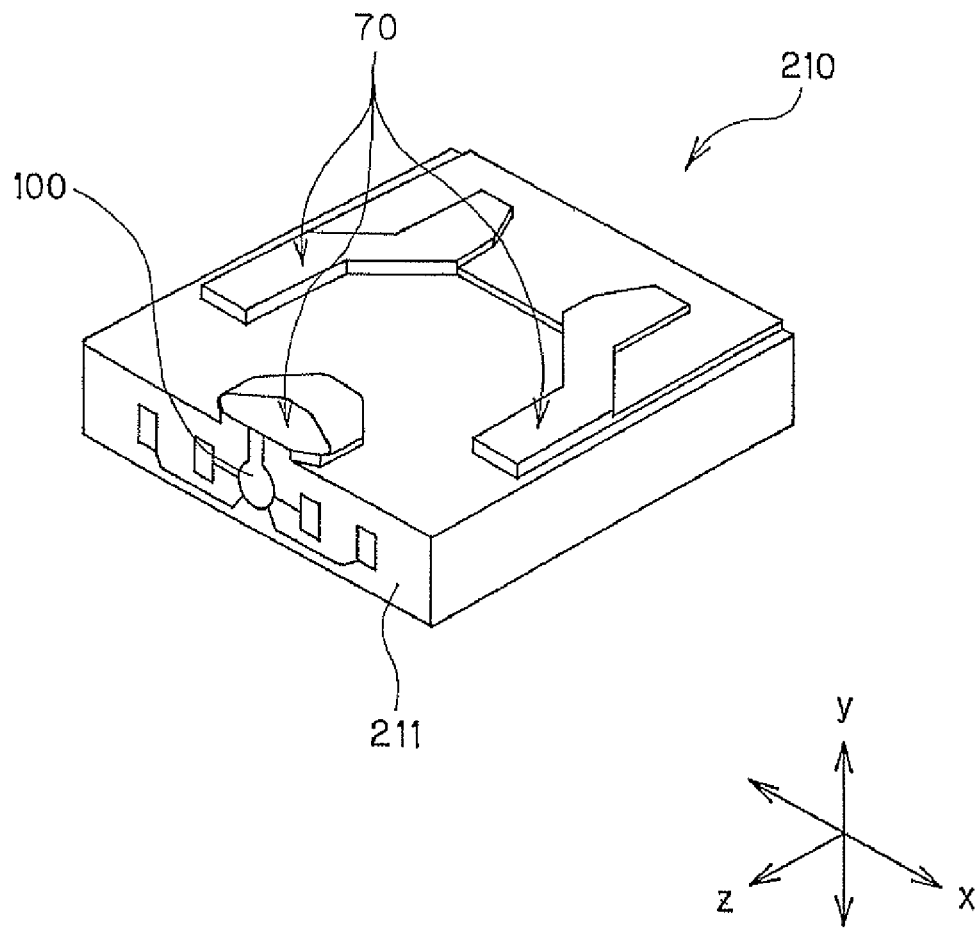
FIG. 24 is a perspective view of a slider that is a part of a head gimbal assembly according to one embodiment of the present invention.

When the hard disk is rotated in the Z direction in FIG. 24, an airflow passing between the hard disk and the slider 210 creates lifting power downwardly in the Y direction in FIG. 24. The slider 210 floats from the surface of the hard disk by this lifting power. The X direction in FIG. 24 is the track traversing direction of the hard disk.

In the vicinity of the end part of the slider 210 on the air exit side (i.e., the end part on the lower left in FIG. 24), a thin film magnetic head according to the present embodiment is formed.

Figure 25:
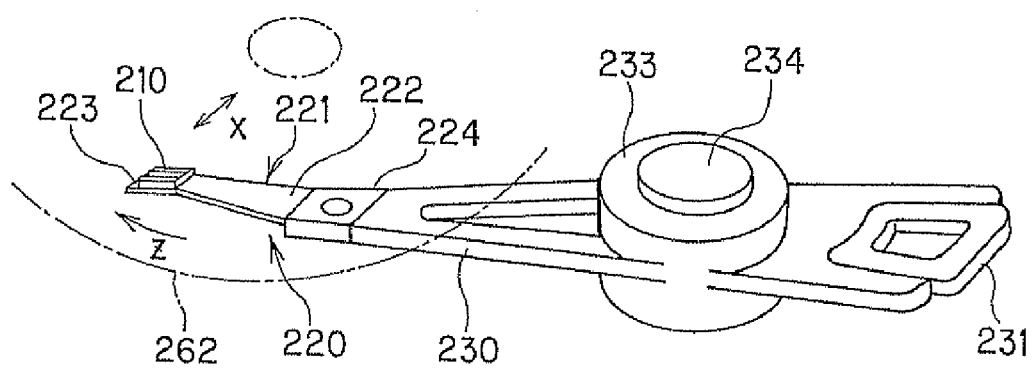
FIG. 25 is a perspective view of a head arm assembly that contains a head gimbal assembly according to one embodiment of the present invention.

Next, a description of the head gimbal assembly 220 according to the present embodiment is described by referring to FIG. 25. The head gimbal assembly 220 is provided with the slider 210 and a suspension 221 for elastically supporting the slider 210. The suspension 221 has a plate spring load beam 222 formed of stainless steel, a flexure 223 that is provided on one end part of the load beam 222 and joined with the slider 210 in a manner of giving the slider 210 a proper degree of freedom, and a base plate 224 provided on the other end part of the load beam 222.

The base plate 224 is mounted on an arm 230 of an actuator for moving the slider 210 in the track traversing direction X of the hard disk 262. The actuator has the arm 230 and a voice coil motor for driving the arm 230. A gimbal part is provided for keeping a posture of the slider 210 constant on the portion of the flexure 223 on which the slider 210 is mounted.

The head gimbal assembly 220 is mounted on the arm 230 of the actuator. One arm 230 with a head gimbal assembly 220 mounted thereon is called a head arm assembly. A carriage having multiple arms, each of which has a head gimbal assembly mounted thereon, is referred to as a head stack assembly.

FIG. 25 shows one embodiment of a head arm assembly. In this head arm assembly, a head gimbal assembly 220 is mounted on one end part of the arm 230. A coil 231, part of a voice coil motor, is mounted on the other end part of the arm 230. A bearing part 233 is provided in the middle part of the arm 230 so that a shaft 234 is rotatably supported.

Figure 26:
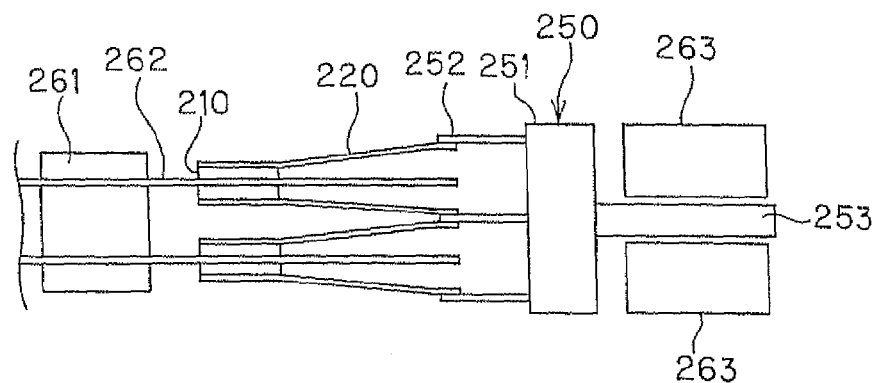
FIG. 26 is an illustration for explaining primary parts of a magnetic disk device according to one embodiment of the present invention.
Figure 27:
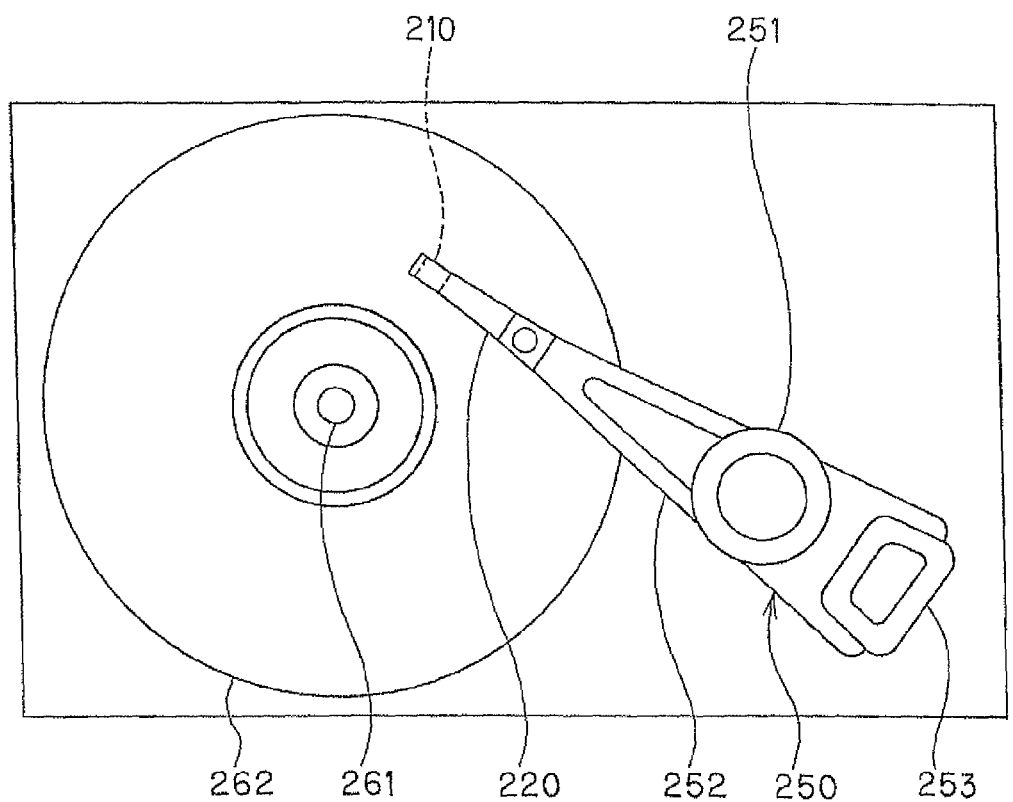
FIG. 27 is a top plan view of a magnetic disk device according to one embodiment of the present invention.

A description of one example of the head stack assembly and the hard disk device according to the present embodiment is described by referring to FIGS. 26 and 27.

FIG. 26 is an illustration for explaining primary parts of a hard disk device. FIG. 27 is a plan view of the hard disk device.

The head stack assembly 250 has a carriage 251 having multiple arms 252. On the multiple arms 252 are mounted multiple head gimbal assemblies 220 in the perpendicular direction at certain intervals. A coil 253, part of a voice coil motor, is mounted on the opposite side of the arms 252 in the carriage 251. The head stack assembly 250 is incorporated into a hard disk device.

A hard disk device has multiple hard disks 262 mounted on a spindle motor 261. Two sliders 210 are disposed for each hard disk 262 in a manner of being opposed to each other by sandwiching the hard disk 262. The voice coil motor has permanent magnets 263 disposed in a manner of being opposed to each other by sandwiching the coil 253 of the head stack assembly 250.

The head stack assembly 250 and an actuator except for sliders 210 support as well as locate the slider 210 relative to the hard disk 22 corresponding to a positioning device of the present invention.

In the hard disk device according to the present embodiment, an actuator allows moving sliders 210 in the track traversing direction of the hard disk 262 in order to position sliders 210 relative to the hard disk 262. Thin film magnetic heads included in sliders 210 record information on the hard disk 262 by the recording head and reproduce (or read) information recorded in the hard disk 262 by the reproducing head.

The head gimbal assembly and hard disk device according to the present embodiment are as effective as the thin film magnetic head according to the above-mentioned embodiment.

In the embodiment, it is explained that a thin film magnetic head has a structure of a reproducing head part formed on the base substrate side and a perpendicular recording head part layered thereon. However, the layering order may be reversed. Moreover, the configuration may be such that only a reproducing part is provided in the case of a reproduction-only thin film head.

EXEMPLARY DETAILED EXPERIMENTS

Descriptions of exemplary detailed experiments are given below for a method for producing a thin film magnetic head according to the present invention in order to explain the invention in more detail.

Embodiment 1

Producing Sample for Embodiment 1 (First Embodiment)

A thin film magnetic head was produced according to the following method.

As shown in FIGS. 4A and 4B, the lower shield electrode layer 3 that was made of NiFe material was formed with a layer thickness of 1 μm. The magnetic sensor multi-layered film 500 with a layer thickness of 30 nm was formed on the lower shield electrode layer 3. The magnetic sensor multi-layered film 500 was a TMR film including a barrier film that was made of MgO. The first ferromagnetic layer 30 and the second ferromagnetic layer 50 were made of CoFe.

The hard mask 12 for etching that was made of Ta with a layer thickness of 40 nm was formed on the magnetic sensor multi-layered film 500.

The hard mask for etching was etched by using a mask that was formed by a photoresist method. As a result, the cut surface 12a including one side 12a that configures the vertex angle of the triangle shape was formed as shown in FIGS. 5A and 5B. The targeted triangle shape was an equilateral triangle in which the vertex angle and basic angles are 60°.

The cut surface 12b including another side 12b that formed the vertex angle 12p of the triangle shape was formed as shown in FIGS. 6A and 6B by etching the hard mask for etching formed in step for first etching the hard mask and by using the mask MS1 formed through the photoresist method, so that the triangular shaped hard mask 12 in which the vertex angle faced the ABS was completely formed.

In the present invention, because the triangle shape (triangular prism shape) was formed through two steps, the vertex angle 12p was formed with a very sharp angle.

The magnetic sensor multi-layered film 500 was etched by using the triangular shaped hard mask 12 as a mask. Then, the stack of the triangular shaped magnetic sensor multi-layered film 500 and the residual triangular shaped hard mask 12 was formed as shown in FIGS. 7A and 7B.

As shown in FIGS. 7B, 8A, and 8B, the first insulating layer 104 that was made of alumina ($Al_2O_3$) was formed on the stack of the triangular shaped magnetic sensor multi-layered film 500 and the residual triangular shaped hard mask 12, and on the lower shield electrode layer 3 on which the stack was formed. Then, the bias magnetic field application layer 106 that was made of CoPt was formed on the first insulating layer 104. And then, the second insulating layer 107 that was made of alumina ($Al_2O_3$) was formed on the bias magnetic field application layer 106.

The first insulating layer 104 with a layer thickness of 5 nm was formed to surround the vicinity of sides of the triangular shaped magnetic sensor multi-layered film 500 through the step for forming the first insulating layer 104.

As shown in FIGS. 9A and 9B, the CMP process was performed until a certain thickness of the residual triangular shaped hard mask 12 remains. The first triangular shaped insulating layer 104 that configured to an outer frame was formed through the CMP process. The outer frame was similar to an outer circumference of the triangular shaped magnetic sensor multi-layered film 500.

As shown in FIGS. 10A and 10B, step for etching was performed for forming the upper shield electrode layer while the regulation for the MR height rear part (shown as a line H in FIG. 10A) that was a posterior length of the rear edge part 500a of the magnetic sensor multi-layered film 500 was performed. After that, the insulating material 109, alumina ($Al_2O_3$), was filled in the etched portion (concave part) formed by this etching.

As shown in FIGS. 11A and 11B, the two contact holes 107a that lead to the bias magnetic field application layer 106 were formed by etching a certain location of the second insulating layer 107 at both edges in the width direction (X direction) of the stack of the triangular shaped magnetic sensor multi-layered film 500 and the residual triangular shaped hard mask 12 while the stack was in an approximate center position (regulation position).

As shown in FIG. 12, conductive wires 107b were drawn from the exposed bias magnetic field application layer 106 through the two contact holes 107a. After the conductive wires 107b were connected with each other, resistance was ready to be measured.

The experiment in which the state for occurrence of the steep increase of resistance was confirmed was performed while the lapping face gradually approached the vertex angle of triangle shape of the magnetic sensor multi-layered film 500 by lapping from the ABS side for making the ABS. Several track widths Tw were measured. The track widths Tw were formed by using the measurement point in which a resistance value is steeply increased based on the method according to the present invention.

Figure 28:
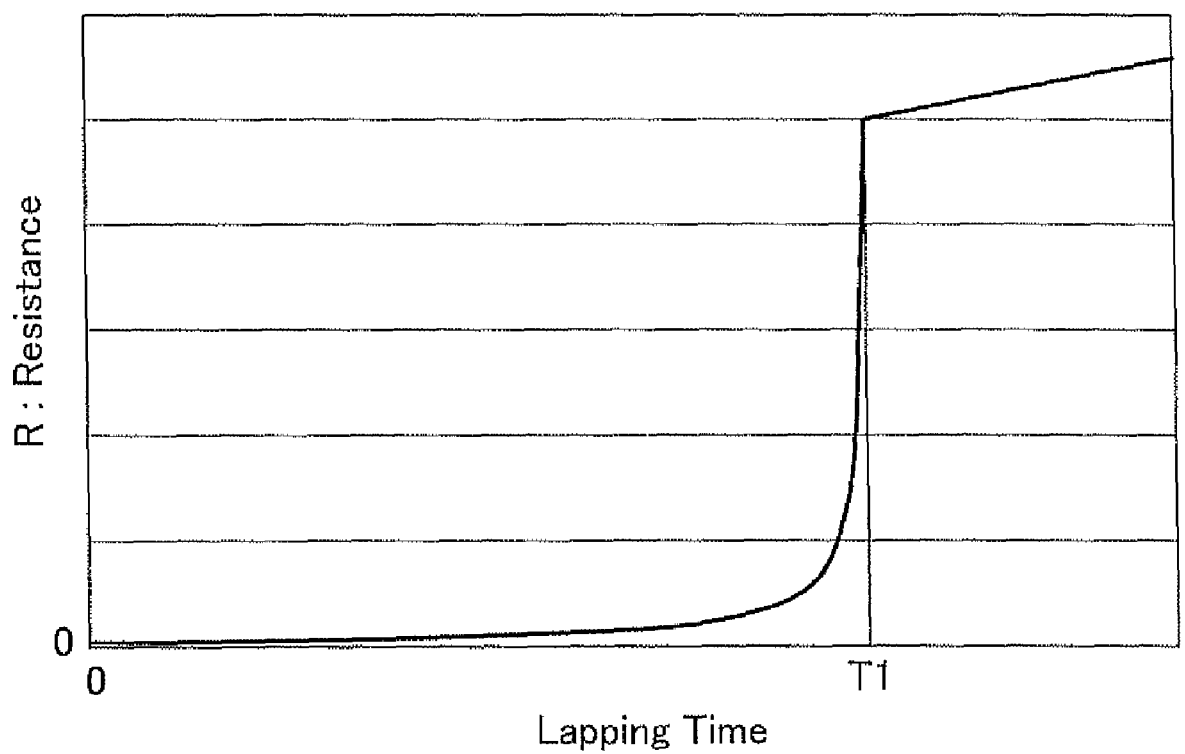
FIG. 28 is an example of a graph showing the relationship between a lapping time and a resistance value.
Figure 29:
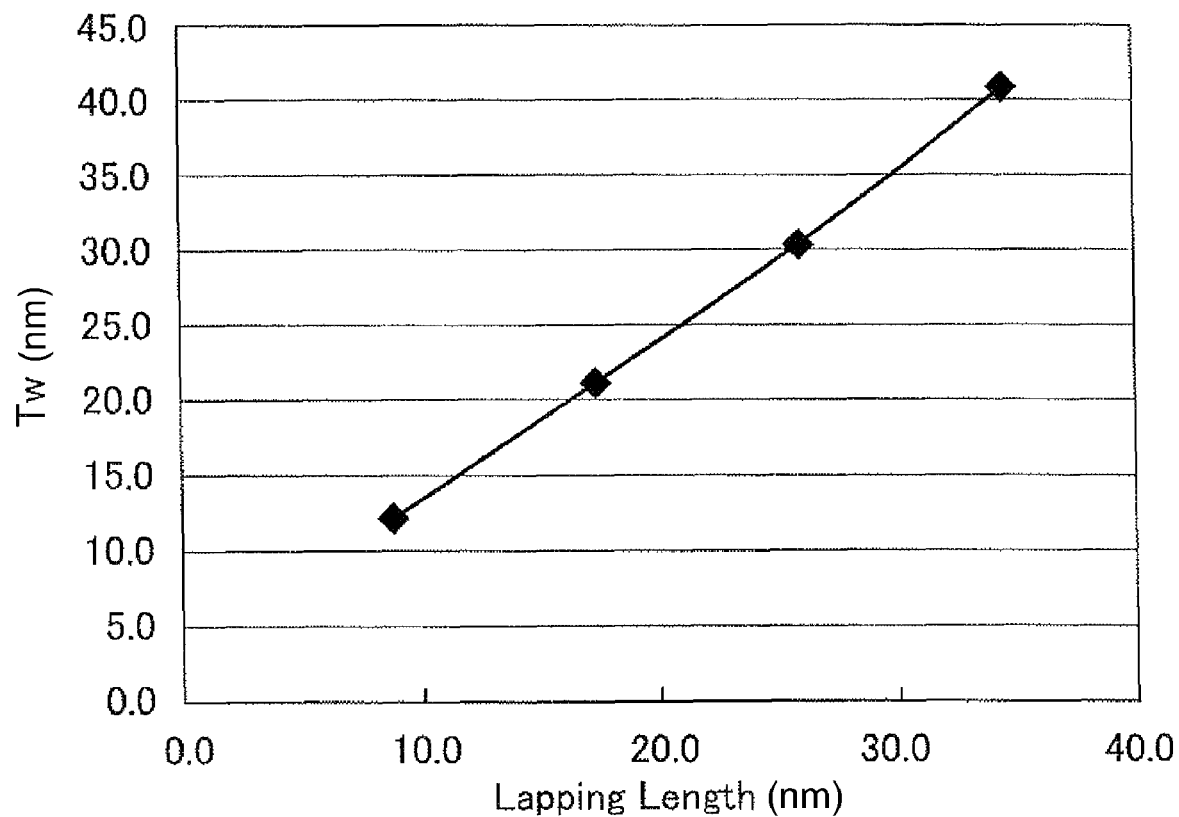
FIG. 29 is a graph showing the relationship between a lapping length (X axis) and a track width (Y axis) for a certain time after a measurement point in which a resistance value is steeply increased.

Results are shown in FIGS. 28 and 29.

FIG. 28 is an example of a graph showing the relationship between a lapping time and a resistance value. It is understood that the resistance value is steeply increased at a certain lapping time T1. When a certain lapping is further performed from this measurement point (lapping is further performed for a certain time), the desired narrow track width Tw is obtained.

FIG. 29 is a graph showing the relationship between a lapping length (X axis) and a track width (Y axis) for a certain time after a measurement point in which a resistance value is steeply increased. In FIG. 29, several data points are plotted as follows: the track width Tw=12.0 nm measured at the lapping length is 8.7 nm; the track width Tw=21.0 nm measured at a lapping length of 17.3 nm; the track width Tw=30.4 nm measured at a lapping length of 26.0 nm; and the track width Tw=40.9 nm measured at a lapping length of 34.6 nm.

The limit for the track width in the conventional technology is 40 nm. In the present invention, ultra narrow track widths Tw are obtained, such as 12.0 nm, 26.0 nm, and 30.4 nm. Surprisingly, the ultra narrow track width Tw, 12.0 nm, is obtained.

Embodiment 2

Producing Sample for Embodiment 2 (Second Embodiment)

A thin film magnetic head was produced according to the following method.

As shown in FIGS. 15A and 15B, the lower shield electrode layer 3 that was made of NiFe material was formed with a layer thickness of 1 μm. The magnetic sensor multi-layered film 500 with a layer thickness of 30 nm was formed on the lower shield electrode layer 3. The magnetic sensor multi-layered film 500 was a TMR film including a barrier film that was made of MgO. The first ferromagnetic layer 30 and the second ferromagnetic layer 50 were made of CoFe.

Positive type photoresist film 212 that was made of novolak system resin with a layer thickness of 300 nm was coated on the magnetic sensor multi-layered film 500.

As shown in FIGS. 16A, 16B, 17A, and 17B, the first and second exposures were performed. Then, as shown in FIGS. 18A and 18B, the development was performed. As a result, the triangular shaped photoresist film (resist mask) 212 was formed. The triangle shape was an equilateral triangle in which the vertex angle and basic angles are 60°.

In the present invention, because the triangle shape (triangular prism shape) was formed through two steps, the vertex angle 12p was formed with the very sharp angle.

The magnetic sensor multi-layered film 500 was etched by using the triangular shaped photoresist film (resist mask) 212 as a resist mask. Then, a stack of the triangular shaped magnetic sensor multi-layered film 500 and the residual triangular shaped photoresist film (resist mask) 212 was formed as shown in FIGS. 19A and 19B.

As shown in FIGS. 19B, 20A, and 20B, the first insulating layer 104 that was made of alumina ($Al_2O_3$) was formed on the stack of the triangular shaped magnetic sensor multi-layered film 500 and the residual triangular shaped resist mask 212, and on the lower shield electrode layer 3 on which the stack was formed. Then, the bias magnetic field application layer 106 that was made of CoPt was formed on the first insulating layer 104. And then, the second insulating layer 107 that was made of alumina ($Al_2O_3$) was formed on the bias magnetic field application layer 106.

The first insulating layer 104 with a layer thickness of 5 nm was formed to surround the vicinity of sides of the triangular shaped magnetic sensor multi-layered film 500 through the step for forming the first insulating layer 104.

Next, the CMP process was performed until a certain thickness of the residual triangular shaped resist mask 212 remained. And then, the resist mask 212 was removed as shown in FIGS. 21A and 21B.

The first triangular shaped insulating layer 104 configured to an outer frame was formed through the CMP process. The outer frame was similar to an outer circumference of the triangular shaped magnetic sensor multi-layered film 500.

As shown in FIGS. 22A and 22B, a step for etching was performed for forming the upper shield electrode layer while the regulation for the MR height rear part (shown as a line H in FIG. 10A) that was a posterior length of the rear edge part 500a of the magnetic sensor multi-layered film 500 was performed. After that, the insulating material 109, alumina ($Al_2O_3$), was filled in the etched portion (concave part) formed by this etching.

As shown in FIGS. 23A and 23B, the two contact holes 107a that lead to the bias magnetic field application layer 106 were formed by etching a certain location of the second insulating layer 107 at both edges in the width direction (X direction) of the triangular shaped magnetic sensor multi-layered film 500 while the magnetic sensor multi-layered film 500 was in an approximate center position (regulation position).

As shown in FIG. 12, conductive wires 107b were drawn from the exposed bias magnetic field application layer 106 through the two contact holes 107a. After the conductive wires 107b were connected with each other, resistance was ready to be measured.

The experiment in which the state for occurrence of the steep increase of resistance was confirmed was performed while the lapping face was gradually close to the vertex angle of triangle shape of the magnetic sensor multi-layered film 500 by lapping from the ABS side for making the ABS. Several track widths Tw were measured. The track widths Tw were formed by using the measurement point in which a resistance value is steeply increased based on the method according to the present invention.

As a result, the similar results as the results shown in FIGS. 28 and 29 were obtained.

An effect of the present invention is clear according to the experiment results discussed above.

The present invention relates to a method for producing a thin film magnetic head in which when a magnetic sensor multi-layered film is seen from the X-Y plane that is parallel to a plane of a lower shield electrode layer, the shape of the magnetic sensor multi-layered film is a polygon in which a vertex angle faces an ABS with cutting a tip of the vertex angle. There is step for stopping a lapping process by using a measurement point in which a resistance value is steeply increased while the lapping face was gradually close to the vertex angle of polygonal shape by lapping from the ABS side. Therefore, an excellent effect in which an ultra narrow track width that exceeds limits of photolithography technology can be securely and constantly formed is obtained.

Possibilities for the industrial use of the present invention include its use in a magnetic disk device with an MR element that detects magnetic field intensity as a signal from a magnetic recording medium and so on.

What is claimed is:

1. A method for producing a thin film magnetic head including a magnetoresistive effect element (MR element) that has a magnetic sensor multi-layered film with a polygonal shape such that a vertex angle faces an air bearing surface (ABS) and a tip of the vertex angle is cut when the magnetic sensor multi-layered film is viewed from an X-Y plane that is parallel to a plane of a lower shield electrode layer, and a sense current flows in a lamination direction (Z direction) in the MR element; the method comprising:

step for forming the magnetic sensor multi-layered film on the lower shield electrode layer;

step for forming a hard mask for etching on the magnetic sensor multi-layered film;

step for first etching the hard mask for etching to form a cut surface including one side that configures the vertex angle by etching the hard mask through a mask that is formed by a photoresist method;

step for second etching the hard mask for etching to form a cut surface including another side that configures the vertex angle and to complete the hard mask with a polygonal shape (polygonally shaped hard mask) in which the vertex angle faces the ABS and by etching the hard mask for etching that is formed by the step for first etching through a mask that is formed by a photoresist method;

step for etching the magnetic sensor multi-layered film to form a stack configured with a polygonally shaped magnetic sensor multi-layered film and the residual polygonally shaped hard mask by etching the magnetic sensor multi-layered film through the polygonally shaped hard mask as a mask;

step for forming a first insulating layer on the stack of the polygonally shaped magnetic sensor multi-layered film and the residual polygonally shaped hard mask and on the lower shield electrode layer on which the stack is formed;

step for forming a bias magnetic field application layer on the first insulating layer;

step for forming a second insulating layer on the bias magnetic field application layer;

step for processing planarization to planarize the polygonally shaped hard mask such that a certain thickness of the hard mask remains;

step for forming two contact holes that lead to the bias magnetic field application layer by etching the second insulating layer at both edges of the stack in the width direction with respect to the stack of the polygonally shaped magnetic sensor multi-layered film and the residual polygonally shaped hard mask that is laminated on the polygonally shaped magnetic sensor multi-layered film;

step for stopping a lapping process by using a measurement point in which a resistance value is steeply increased while the lapping face is gradually approaching the vertex angle of polygonal shape by lapping from the ABS side and as measuring the resistance value by connecting the two contact holes with each other.

2. The method for producing the thin film magnetic head according to claim 1, wherein a part surrounded by the first insulating layer exists in the vicinity of sides of the polygonally shaped magnetic sensor multi-layered film through the step for forming the first insulating layer.

3. The method for producing the thin film magnetic head according to claim 1, wherein the first insulating layer exists in the vicinity of sides of the magnetic sensor multi-layered film in the polygonal shape through the step for processing planarization, and the first insulating layer is configured to have an outer frame that is similar to an outer circumference of the polygonally shaped magnetic sensor multi-layered film.

4. The method for producing the thin film magnetic head according to claim 1, wherein, in the step for stopping the lapping process by using the measurement point in which the resistance value is steeply increased, the lapping process is stopped after a certain time, which is predetermined in relation to the lapping speed, elapses since the resistance value is steeply increased because conductivity is lost due to cutting the tip of the vertex angle of the polygon.

5. The method for producing the thin film magnetic head according to claim 1, wherein the tip of the vertex angle of the magnetic sensor multi-layered film is cut through the step for stopping the lapping process by using the measurement point in which the resistance value is steeply increased, and a track width is regulated based on an exposed width.

6. The method for producing the thin film magnetic head according to claim 5, wherein the track width is 10-35 nm.

7. The method for producing the thin film magnetic head according to claim 1, further comprising, between the step for processing planarization and the step for forming two contact holes, a step for regulating an MR height that is a posterior length of the rear edge part of the magnetic sensor multi-layered film and for etching to form an upper shield electrode layer.

8. The method for producing the thin film magnetic head according to claim 7, further comprising, after the step for regulating the MR height and etching to form the upper shield electrode layer, a step for refilling an etched portion formed by the above step with an insulating film.

9. The method for producing the thin film magnetic head according to claim 1, wherein the magnetic sensor multi-layered film is configured with a spacer layer, a magnetic pinned layer and a free layer that are laminated to sandwich the spacer layer, and the bias magnetic field application layer is located on the both sides of the multi-layered film in the width direction through the first insulating layer.

10. The method for producing the thin film magnetic head according to claim 1, wherein the polygonal shape is one of a triangle and a pentagon.

11. The method for producing the thin film magnetic head according to claim 1, wherein the hard mask is made of Ta, Ru, or Cr.

12. A method for producing a thin film magnetic head including a magnetoresistive effect element (MR element) that has a magnetic sensor multi-layered film having a polygonal shape such that a vertex angle faces an air bearing surface (ABS) and a tip of the vertex angle is cut when the magnetic sensor multi-layered film is viewed from an X-Y plane that is parallel to a plane of a lower shield electrode layer, and a sense current flows in a lamination direction (Z direction) in the MR element; the method comprising:

step for forming the magnetic sensor multi-layered film on the lower shield electrode layer;

step for forming a photoresist film on the magnetic sensor multi-layered film;

step for a first exposure to expose the photoresist film after a mask is applied with respect to the photoresist film for making a latent image for a cut surface including one side that configures the vertex angle;

step for a second exposure to expose the photoresist film after a mask is applied with respect to the photoresist film for making a latent image that is for a cut surface including another side that configures the vertex angle and that is for the polygonal shape in which the vertex angle faces the ABS;

step for a development to develop the photoresist film so as to maintain the photoresist film with the polygonal shape (polygonally shaped photoresist film) after the steps for the first and second exposures;

step for etching the magnetic sensor multi-layered film using the polygonally shaped photoresist film as a resist mask for etching (polygonally shaped resist mask) in order to form a stack configured with a polygonally shaped magnetic sensor multi-layered film and the residual polygonally shaped photoresist film;

step for forming a first insulating layer on the stack of the polygonally shaped magnetic sensor multi-layered film and the resist mask for etching with the polygonal shape (polygonally shaped resist mask) and on the lower shield electrode layer on which the stack is formed;

step for forming a bias magnetic field application layer on the first insulating layer;

step for forming a second insulating layer on the bias magnetic field application layer;

step for processing planarization to planarize the polygonally shaped resist mask for etching such that a certain thickness of the resist mask for etching remains;

step for removing the residual polygonally shaped resist mask for etching;

step for forming two contact holes that lead to the bias magnetic field application layer by etching the second insulating layer at both edges of the stack in the width direction with respect to the polygonally shaped magnetic sensor multi-layered film;

step for stopping a lapping process by using a measurement point in which a resistance value is steeply increased while the lapping face is gradually approaching the vertex angle of polygonal shape by lapping from the ABS side and as measuring the resistance value through connecting the two contact holes with each other.

13. The method for producing the thin film magnetic head according to claim 12, wherein a part surrounded by the first insulating layer exists in the vicinity of sides of the polygonally shaped magnetic sensor multi-layered film through the step for forming the first insulating layer.

14. The method for producing the thin film magnetic head according to claim 12, wherein the first insulating layer exists in the vicinity of sides of the polygonally shaped magnetic sensor multi-layered film through the step for processing planarization, and the first insulating layer is configured to have an outer frame that is similar to an outer circumference of the polygonally shaped magnetic sensor multi-layered film.

15. The method for producing the thin film magnetic head according to claim 12, wherein, in the step for stopping the lapping process by using the measurement point in which the resistance value is steeply increased, the lapping process is stopped after a certain time, which is predetermined in relation to the lapping speed, elapses since the resistance value is steeply increased because conductivity is lost due to cutting the tip of the vertex angle of the polygon.

16. The method for producing the thin film magnetic head according to claim 12, wherein the tip of the vertex angle of the magnetic sensor multi-layered film is cut through the step for stopping the lapping process by using the measurement point in which the resistance value is steeply increased, and a track width is regulated based on an exposed width.

17. The method for producing the thin film magnetic head according to claim 16, wherein the track width is 10-35 nm.

18. The method for producing the thin film magnetic head according to claim 12, further comprising, between the step for processing planarization and the step for forming two contact holes, a step for regulating an MR height that is a posterior length of the rear edge part of the magnetic sensor multi-layered film and for etching to form an upper shield electrode layer.

19. The method for producing the thin film magnetic head according to claim 18, further comprising, after the step for regulating the MR height and etching to form the upper shield electrode layer, a step for refilling an etched portion formed by the above step with an insulating film.

20. The method for producing the thin film magnetic head according to claim 12, wherein the polygonal shape is one of a triangle or a pentagon.

* * * * *